United States Patent
Barrett et al.

(10) Patent No.: US 9,811,439 B1
(45) Date of Patent: Nov. 7, 2017

(54) FUNCTIONAL TESTING OF CODE MODIFICATIONS FOR READ PROCESSING SYSTEMS

(71) Applicants: Ryan Barrett, San Francisco, CA (US); Krishna Pant, San Jose, CA (US)

(72) Inventors: Ryan Barrett, San Francisco, CA (US); Krishna Pant, San Jose, CA (US)

(73) Assignee: COLOR GENOMICS, INC., Burlingame, CA (US)

( * ) Notice: Subject to any disclaimer, the term of this patent is extended or adjusted under 35 U.S.C. 154(b) by 0 days.

(21) Appl. No.: 15/489,492

(22) Filed: Apr. 17, 2017

Related U.S. Application Data

(60) Provisional application No. 62/324,078, filed on Apr. 18, 2016.

(51) Int. Cl.
*G06F 9/44* (2006.01)
*G06F 11/36* (2006.01)
*G06F 11/26* (2006.01)

(52) U.S. Cl.
CPC .......... *G06F 11/3612* (2013.01); *G06F 11/26* (2013.01)

(58) Field of Classification Search
CPC ...... G06F 11/26; G06F 11/34–11/3495; G06F 11/36–11/3692
USPC ....................................................... 717/133
See application file for complete search history.

(56) References Cited

U.S. PATENT DOCUMENTS

| | | | | |
|---|---|---|---|---|
| 6,002,869 A | * | 12/1999 | Hinckley | G06F 11/3696 714/35 |
| 6,112,312 A | * | 8/2000 | Parker | G06F 11/263 700/79 |
| 7,437,614 B2 | * | 10/2008 | Haswell | G06F 11/3684 714/38.13 |
| 7,861,226 B1 | * | 12/2010 | Episkopos | G06F 11/3676 717/124 |
| 7,895,565 B1 | * | 2/2011 | Hudgons | G06F 11/3684 717/106 |

(Continued)

FOREIGN PATENT DOCUMENTS

PL  WO 2016122336 A1 * 8/2016 .......... G06F 11/3604

OTHER PUBLICATIONS

U.S. Appl. No. 15/133,089, filed Apr. 19, 2016.
U.S. Appl. No. 62/150,218, filed Apr. 20, 2016.
U.S. Appl. No. 62/274,660, filed Jan. 4, 2016.

*Primary Examiner* — Francisco Aponte
(74) *Attorney, Agent, or Firm* — Kilpatrick Townsend & Stockton LLP

(57) ABSTRACT

Techniques for using functional testing to detect run-time impacts of code modifications. A method includes accessing a workflow including a plurality of stages for processing reads. The stages are defined based on modifiable code and include a first stage for aligning reads with a corresponding portion of a reference data set and a second stage for collectively analyzing data corresponding to the aligned reads. The method includes identifying functional testing specifications to correspond with the workflow, including a definition of which stages are to be performed during functional testing, a reduced reference data set, and a set of reads. The method includes performing the functional testing using the reduced reference data set and the set of reads, detecting a result generated via the performance, and outputting the result.

20 Claims, 12 Drawing Sheets

(56) References Cited

U.S. PATENT DOCUMENTS

| | | | | |
|---|---|---|---|---|
| 8,037,453 B1* | 10/2011 | Zawadzki | G06F 8/71 | 717/107 |
| 8,239,831 B2* | 8/2012 | Brennan | G06F 11/3664 | 717/124 |
| 8,434,058 B1* | 4/2013 | Hudgons | G06F 11/3672 | 717/106 |
| 8,468,124 B2* | 6/2013 | Bonanno | G06F 11/362 | 707/608 |
| 8,494,832 B2* | 7/2013 | Krishnan | G06F 11/3696 | 703/22 |
| 8,949,770 B2* | 2/2015 | StClair | G06F 8/10 | 717/101 |
| 8,949,772 B1* | 2/2015 | Talby | G06F 8/35 | 714/38.14 |
| 9,304,892 B2* | 4/2016 | Schur | G06F 11/3684 | |
| 9,396,097 B2* | 7/2016 | Lopian | G06F 11/3684 | |
| 9,507,699 B2* | 11/2016 | Provost | G06F 11/3688 | |
| 9,575,751 B2* | 2/2017 | Balat | G06F 8/73 | |
| 2007/0220479 A1* | 9/2007 | Hughes | G06Q 30/02 | 717/100 |
| 2010/0077260 A1* | 3/2010 | Pillai | G06F 11/263 | 714/46 |
| 2011/0138357 A1* | 6/2011 | Mishra | G06F 11/3696 | 717/124 |
| 2012/0296687 A1* | 11/2012 | Satyanarayana | G06Q 10/06312 | 705/7.22 |
| 2013/0074043 A1* | 3/2013 | Fu | G06F 11/3684 | 717/125 |
| 2013/0104106 A1* | 4/2013 | Brown | G06F 11/3696 | 717/124 |
| 2013/0339930 A1* | 12/2013 | Xu | G06F 11/3684 | 717/125 |
| 2016/0210361 A1* | 7/2016 | Pistoia | G06F 8/31 | |
| 2016/0275000 A1* | 9/2016 | Sharma | G06F 11/3664 | |
| 2017/0192879 A1* | 7/2017 | Athinathan | G06F 11/3668 | |

* cited by examiner

FUNCTIONAL TESTING OF CODE MODIFICATIONS FOR READ PROCESSING SYSTEMS

CROSS-REFERENCES TO RELATED APPLICATIONS

The application claims the benefit of and the priority to U.S. Provisional Application No. 62/324,078, filed on Apr. 18, 2016, which is hereby incorporated by reference in its entirety for all purposes.

BACKGROUND OF THE INVENTION

Workflows may be defined to process reads corresponding to various clients. Workflows may include various stages, such as aligning reads to portions of a reference data set, determining whether reads include sparse indicators with respect to the corresponding portions of the reference data set, and/or generating risk variables. Each one of these stages may be performed by executing a piece of code. As code is periodically modified, a particular modification to a piece of code may cause the workflow to become unoperational by producing an error or an incorrect result. Determining whether a particular modification would cause the workflow to become unoperational is difficult and time consuming. Thus, there is a need for new systems, methods, products, and other techniques in the area.

BRIEF SUMMARY OF THE INVENTION

Techniques are disclosed for using functional testing to detect run-time impacts of code modifications. The method may include accessing a workflow for processing reads. The workflow may include a plurality of stages with at least one stage of the plurality of stages being performed via execution of a modifiable code. The plurality of stages may include a first stage for aligning each of a plurality of reads with a corresponding portion of a reference data set, with the first stage being defined based on first modifiable code. The plurality of stages may also include a second stage for collectively analyzing data corresponding to the aligned reads, with the second stage being defined based on second modifiable code. The method may also include identifying functional testing specifications to correspond with the workflow.

The functional testing specifications may include a definition of at least part of the workflow to be conducted during functional testing, with the at least part of the workflow including one or more stages. The functional testing specifications may also include a reduced reference data set to be used in place of the reference data set in the functional testing, with a size of the reduced reference data set being smaller than a size of the reference data set. The functional testing specifications may further include read data that includes a set of reads to be used as input for the functional testing, with each read of the set of reads including a set of identifiers and the set of identifiers being arranged in a particular order in the read. The method may also include performing the functional testing for the at least part of the workflow, with the functional testing including performing the one or more stages of the workflow using the read data and the reduced reference data set. The method may further include detecting a result generated via the performance and outputting the result.

In some embodiments, the one or more stages of the at least part of the workflow includes the second stage but not the first stage. In some embodiments, the read data includes an aligned set of reads. In some embodiments, the result includes a technical result indicating one or more of: whether an error was detected, whether a warning was detected, a time duration of performing the one or more stages, and a characterization of a resource usage while performing the one or more stages. In some embodiments, the result is one or more of: alignment data indicating, for each read in the set of reads, a portion of the reduced reference data set to which the read was aligned, and variant-detection data identifying, for each read in one or more of the set of reads, any variant detected to be in the read.

In some embodiments, performing the one or more stages of the workflow includes performing a first version of the first modifiable code and performing a second version of the second modifiable code. In some embodiments, the method includes detecting an input corresponding to an indication that at least one of the first version of the first modifiable code and the second version of the second modifiable code are approved for storage. In some embodiments, the method also includes, in response to detecting the input, updating a live version of the workflow to include at least one of the first version of the first modifiable code and the second version of the second modifiable code. In some embodiments, updating the live version includes transmitting at least one of the first version of the first modifiable code and the second version of the second modifiable code to a remote server or remote data store. In some embodiments, the remote server or remote data store is used to perform the live version of the workflow on client reads. The method may further include accessing a second set of reads, with each read in the second set of reads corresponding to a particular client. In some embodiments, the method includes performing the workflow using the second set of reads, with the workflow being performed using the first version of the first modifiable code and the second version of the second modifiable code.

Some embodiments of the present disclosure include a system including one or more data processors. In some embodiments, the system includes a non-transitory computer readable storage medium containing instructions which when executed on the one or more data processors, cause the one or more data processors to perform part of all of one or more methods and/or part or all of one or more processes disclosed herein. Some embodiments of the present disclosure include a computer-program product tangibly embodied in a non-transitory machine-readable storage medium including instructions configured to cause one or more data processors to perform part of all of one or more methods and/or part or all of one or more processes disclosed herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Figure 1:
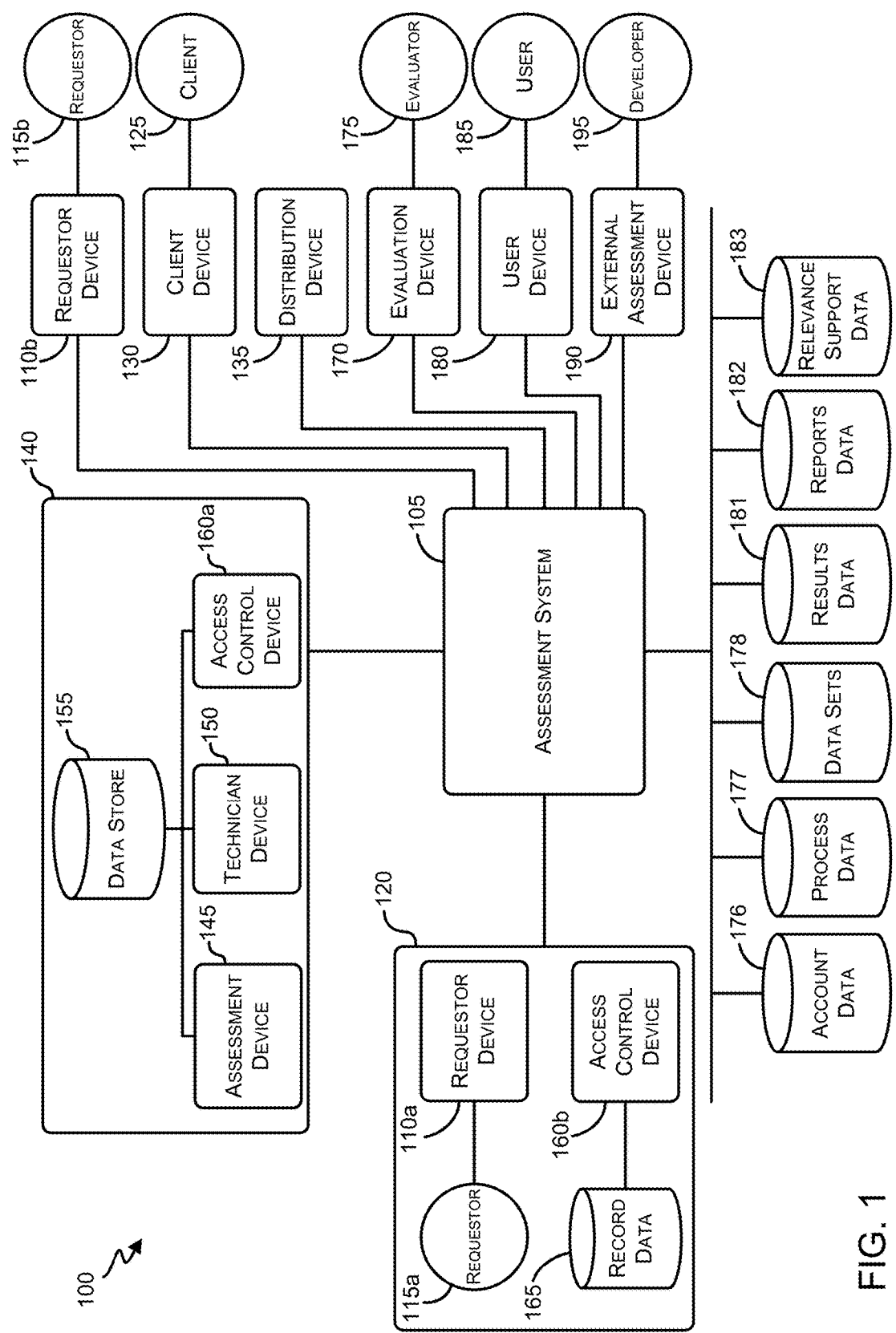
FIG. 1 shows a representation of a data processing network, in accordance with some embodiments of the invention.
Figure 2:
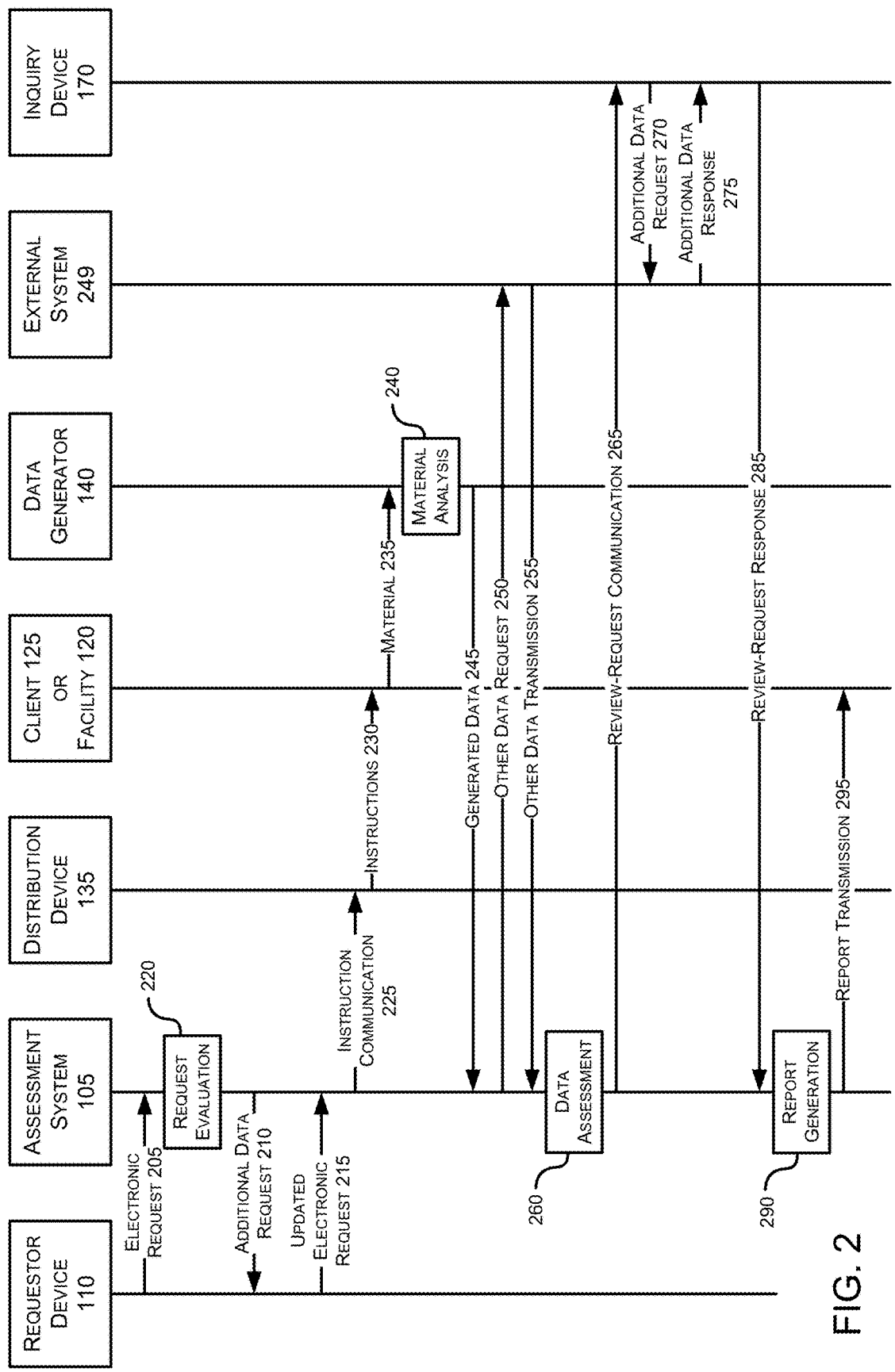
FIG. 2 shows a communication exchange between systems and devices of an data processing network, in accordance with some embodiments.

FIG. 1 shows a representation of an assessment network 100. In addition, FIG. 2 illustrates interactions between various systems or components of assessment network 100 to illustrate the flows of data and materials, for example. An assessment system 105 may, for example, receive an electronic request 205 from a requestor device 110. Assessment system 105 may include one or more electronic devices (e.g., storage devices, servers, and/or computers) and may, but not need, reside partly or entirely at a remote server. Requestor device 110 may be configured and located to receive input from a requestor 115. In one instance, requestor device 110a is located in an external facility 120. In one instance, requestor device 110b includes an internally linked requestor device 110b, such as one that itself receives invitations, such as from assessment system 105, to generate electronic requests.

Request 205 may include instructions to conduct a dataset analysis, for example. Optionally, request 205 may be encrypted prior to transmission; such an electronic request may be decrypted upon receipt. Request 205 may identify, or otherwise indicate, one or more states to be evaluated during the analysis and/or during an assessment. Request 205 may identify a client and/or include additional data pertaining to the client, such as client-identifying data.

The client may be equated to, by assessment system 105, a client device 130. In some instances, a client device 130, associated with client 125, initially transmits a preliminary electronic request for the analysis and/or assessment to assessment system 105. For example, such a preliminary electronic request may be initiated via interaction with a website associated with assessment system 105. The same or a subsequent preliminary request may identify a particular requestor (e.g., by name, office location, phone number, and/or email address) and/or may request that a requestor 115b associated with an internally linked requestor device 110b submit such a request.

When a particular entity is identified in a preliminary electronic request, assessment system 105 may identify a destination address (e.g., IP address or email address) associated with the entity and transmit a communication identifying information associated with the preliminary request (e.g., the client, a type of analysis, and so on). The communication may include a partial instruction and/or an input field that would confirm that the request of the client 125 is to be generated and transmitted back to assessment system 105. Such a communication may facilitate receipt of the electronic request 205 from requestor device 110b.

When it is requested that a requestor 115b associated with an internally linked requestor device 110b submit such a request, assessment system 105 may transmit a similar communication to a requestor device 110b that may have been selected from among multiple internally linked requestor devices. The selection may be based on a load balancing technique, availability hours, expertise, locations of the multiple requestor devices, a pseudo-random selection technique, and/or an entity affiliation.

Once request 205 has been received from a requestor device 110 (e.g., in response to a preliminary request from a client device 130), assessment system 105 may evaluate, such as at block 220, the request 205 to ensure that all required data has been provided and that all required data pertaining to client 125 has been identified (e.g., via the request, a preliminary request and/or stored data). If assessment system 105 determines that all required information has not been identified, a request 210 for such information may be transmitted to requestor device 110 and/or client device 130. The request 205 may be updated with this information and an updated electronic request 215 may be transmitted to assessment system 105. In various instances, an object provided to a user depends on an analysis requested, whether, and what kind of, new data-generation processing of a material is required for the analysis, a number of data-set units being assessed (e.g., and whether they have been previously assessed), a number and/or type of analyses being requested, a number and/or type of analyses previously requested, a number and/or type of analyses predicted to be requested subsequently, a state for which a progression prediction is being requested, whether a user is granting other entities' access to the client's data or results, whether a user is authorizing additional analyses to be performed on the client's data, and/or whether a user is granting permission to send offers to request user access to results or reports other than those initially being requested.

When all required information has been provided, assessment system 105 may send an instruction communication 225 to a distribution device 135. Optionally, communication 225 may be encrypted prior to transmission; such an encrypted communication may be decrypted upon receipt. Optionally, communication 225 may be transmitted using communications system 308 and/or over one or more network links, such as including transmission, at least in part, over a public communications network, such as the Internet. Communication 225 may include, for example, a name and address of client 125 and, in some instances, an indication as to what is to be provided to client 125 for collection of a material for subsequent analysis. For example, a request 205 may indicate a type of analysis that is to be performed on a material (e.g., an analysis pertaining to a likelihood of getting one or more particular types of states) and/or a type of material (e.g., type of sample) that is to be analyzed. Communication 225 may identify the type of analysis, type of material, and/or kit associated with collection of the material. The communication 225 may thus facilitate and/or trigger a physical distribution of instructions 230, which may include a kit or other sample collection materials, to a client address. The instructions 230 may include, for example, instructions as to how to collect a material, a container for storing the material and/or information pertaining to an instruction or type of analysis to be conducted. Alternatively, the instructions 230 may be provided to a facility 120, such as may be associated with a requestor 115a, who may aid client 125 in obtaining the material.

A material 235 from client 125 may then be directed to and received at a data generator 140 for analysis 240. Data generator 140 may be, for example, part of a facility. Data generator 140 may include one or more assessment devices 145 configured to generate data reads, data elements, or data sets for various data-set units using the material 235 as part of analysis 240. For example, an assessment device 145 may include a data-characterizer device (e.g., sequencer and/or polymerase chain reaction machine). Data generator 140 may further include one or more devices 150, such as a desktop or laptop computer. Generated data 245 generated by or at one or more devices (e.g., assessment device 145 or technician device 150) may be stored at a data store 155, which may be remote from all data generator devices or part of a data generator device. Data 245 may, for example, include identifying client information (e.g., a name and address), facility information (e.g., location and name), device specifications (e.g., manufacturer and model of assessment device) and data. In some embodiments, a facility, such as facility 120 or facility 140, may correspond to a lab.

In some instances, data is optionally collected or requested from one or more external systems 249. Thus, assessment system 105 may transmit one or more other data requests 250 and one or more other data transmissions 255 may provide the other data. For example, one or more data sets and/or one or more processed versions thereof (e.g., identifying one or more sparse indicators) corresponding to an existing or new client may be received from an external system 249, As another example, assessment system 105 may transmit a client data set to an external system 249, and external system 249 may then return a result of an assessment of the client data set. As yet another example, other data may include a data set (or results based on such data) corresponding to another individual (e.g., an entity related to a client and/or an entity sharing a characteristic with a client). The other individual may be, for example, identified based on input from the client and/or automatically identified (e.g., based on a query of a data store to identify clients associated with inputs or results indicating a shared characteristic or relationship). In some instances, a state assessment variable may be generated based on data from multiple other people, and the data for each other person may be weighted based on (for example) how closely related the person is with a client and/or how many or which characteristics the person shares with a client.

An access control device 160a may control which devices and/or entities may gain access to data 245, which may apply to devices and/or entities internal to data generator 140 and/or to devices and/or entities external to data generator 140. Access control device 160a may implement one or more rules, such as restricting access to client data to one or more particular devices (e.g., associated with assessment system 105). Such access may further or alternatively be controlled via logins, passwords, device identifier verification, etc.

In various instances, access control device 160a controls access via control of pushed transmissions and/or via control of processing pull requests. For example, a rule may indicate that data 245 pertaining to a material, such as a sample, is to automatically be transmitted to a particular assessment system 105 (and/or device associated therewith) upon completion of a facility-based assessment or detection of particular data (e.g., data matching a request). Access control device 160a may then monitor for such a criterion to be met and may then generate and transmit appropriate data.

Data 245 may include a plurality of data reads, data elements, or sets (e.g., each data read in the plurality of data reads corresponding to a same client, or at least some of the plurality of data reads corresponding to different clients). In various instances, data 245 may be transmitted to assessment system 105 in a batch-mode, in a streaming mode, in real-time as data is produced, and/or upon request. Data 245 may also be stored at a data store local or remote to data generator 140. A given transmission or stream may include data that corresponds to a single, or in other instances to multiple, client, sample, and/or data reads. In some instances, access control device 160a evaluates one or more transmission conditions, which may indicate, for example, whether and/or what data is to be transmitted given a quantity of data collected (e.g., generally, since a past transmission and/or for a given client or sample) and/or given a time since a previous transmission. In one instance, as data reads are generated by an assessment device, a data set is generated so as to include each new data read and one or more identifiers (e.g., of a client, sample, time and/or facility device). The data may then be transmitted via a discrete communication (e.g., via FTP, over a webpage upload, email message, or SMS message) to assessment system 105. In one instance, the data may then be appended to a stream that is being fed to assessment system 105.

It will be appreciated that assessment network 100 may, in some instances, include multiple data generators 140, each of which may include an assessment device 145, technician device and/or access control device 160*a*. Further, a given data generator 140 may, in some instances, include multiple assessment devices 145, multiple technician devices 150 and/or multiple access control devices 160*a*. Thus, data 245 received at assessment system 105 may include data collected by and/or derived from data collected by different assessment devices, which may result in the data having different biases, units, and/or representation. Similarly, personnel operating different technician devices 150 may utilize different protocols and/or data interpretation techniques, which may again result in receipt of data at assessment system 105 that has different biases, units, variables, and so on. Further, even data originating from a same device may, in time, exhibit different biases, units, and so on, which may be a result of a manipulation of a control of the device and/or equipment wear.

Thus, in some instances, assessment system 105 performs a comparison across data 245 received from a data generator device (e.g., an access control device 160*a* or directly from an assessment device 145 or technician device 150) associated with data generator 140. The comparison may be across, for example, data collected at different facilities, data based on measurements collected at different devices, and/or data collected at different times. It will be appreciated that the comparison may include a direct comparison of collected data or comparing preprocessed versions of the collected data. For example, received data may first be preprocessed via a transformation and/or dimensionality-reduction technique, such as principal component analysis, independent component analysis, or canonical correspondence analysis.

The comparison may include, for example, performing a clustering technique so as to detect whether data corresponding to a given facility, device, or time period predominately resides in a different cluster than data corresponding to one or more other facilities, devices, or time periods. The clustering technique may include, for example, a connectivity based clustering technique, a centroid-based clustering technique (e.g., such as one using k-means clustering), a distribution-based clustering technique, or a density-based clustering technique.

The comparison may additionally or alternatively include a statistical technique, such as one that employs a statistical test to determine whether two or more data sets (e.g., corresponding to different facilities, devices, or time periods) are statistically different. For example, a Chi-square, t-test or ANOVA may be used.

The comparison may additionally or alternatively include a time-series analysis. For example, a regression technique may be used to determine whether output from a given device is gradually changing in time.

When it is determined that particular data corresponding to a given facility, device, or time period is different than data corresponding to one or more other facilities, devices, or time periods (e.g., is assigned to a different cluster than other data or is associated with a p-value below a threshold), a normalization and/or conversion factor may further be identified. For example, a normalization and/or conversion factor may be identified based on centroids of data clusters and/or inter-cluster distances. As another example, a linear or non-linear function may be derived to relate data from a given facility, device, or time period to other data.

In some instances, a determination that particular data corresponding to a given facility, device, or time period is different than data corresponding to one or more other facilities, devices, or time periods may indicate that data from the given facility, device, or time period is not to be used. In such instances, an instruction communication may be sent to a facility to reprocess a material, such as a sample.

In addition to receiving data 245, assessment system 105 may further collect one or more other data that may be used to assess, for example, a likelihood for transitioning into a particular state. For example, one type of other data may include inputs provided at a client device 130, such as inputs that indicate past-state data and/or current-state data, familial-state data and statuses, age, occupation, activity patterns, association with environments having particular characteristics, and so on. The other data may be received by way of one or more other data transmissions 255 from external system 249. Optionally, other data transmission 255 may be encrypted prior to transmission; such an encrypted transmission may be decrypted upon receipt. Optionally, other data transmission 255 may be transmitted over one or more network links, such as including transmission, at least in part, over a public communications network, such as the Internet. Optionally, other data transmission 255 may be transmitted over at least a portion of communications system 308.

Another type of other data may include data automatically detected at a client device 130. For example, a wearable client device may track activity patterns so as to estimate calories burned per day, or the wearable client device may estimate a pulse distribution, client temperature, sleep patterns and/or indoor/outdoor time. This data obtained directly by client device 130 may be directly transmitted (e.g., after request 250 and/or authorization handshake) to assessment system 105 and/or via another client device (e.g., via accessing health-data on a phone or computer device). Optionally, other data obtained directly by client device 130 may be transmitted over one or more network links, such as including transmission, at least in part, over a public communications network, such as the Internet. Optionally, other data obtained directly by client device 130 may be transmitted over at least a portion of a communication system. Optionally, other data obtained directly by client device 130 may be part of other data transmission 255.

Yet another type of other data may include record data, which may be stored, for example, at a record data store 165 at and/or associated with an external facility, such as one having provided an electronic request to perform an analysis or assessment pertaining to a client and/or one as identified via input at a client device 130. To illustrate, the other data may identify one or more client reported experiences and/or evaluation results for a client or may include a result of one or more tests.

In some instances, other data may include data pertaining to a different client. For example, it may be determined or estimated that a given client is related to another client. Such determination or estimation may be based on inputs detected at a client device identifying one or more family members (e.g., by name), and a data store may be queried to determine whether any clients match any of the family member identifications. Such relationship determination or estimation may alternatively or additionally be based on a data set analysis, such that a raw or processed data set from the given client is compared to a raw or processed data set from some or all other clients to identify, for example, whether any other clients share a threshold portion of a data set with the client. Upon detecting an above-threshold match, a percentage of value matching may be used to estimate a type of relationship between the clients. Upon identifying a related client, other data corresponding to the related client may be identified. For example, the other data may include a past or current state of the related client. The other data may be identified (for example) based on an input provided by the client or the related client or record data associated with the related client.

Thus, assessment system 105 may have access to, for a given client, one or more data sets, data set availability modification data, client-reported data, record data, test data, activity data, and/or other types of data. These data may be detected, assessed, or otherwise evaluated, at block 260, such as in one or more assessment processes. Data sets may be evaluated to detect and assess sparse indicators, for example, as described below in further detail. The detection and/or assessment at block 260 may be performed, for example, partly or fully at assessment system 105. In some instances, the detection and/or assessment at block 260 is performed in a partly or fully automated manner. In some instances, the detection and/or assessment at block 260 involves processing of inputs provided by a reviewer or evaluator.

Generation of a report, at block 290, may be performed using the results of data assessment of block 260. A report transmission 295 may include the report and be transmitted to client 125 or facility 120, such as by way of client device 130 or requestor device 110a.

Figure 3:
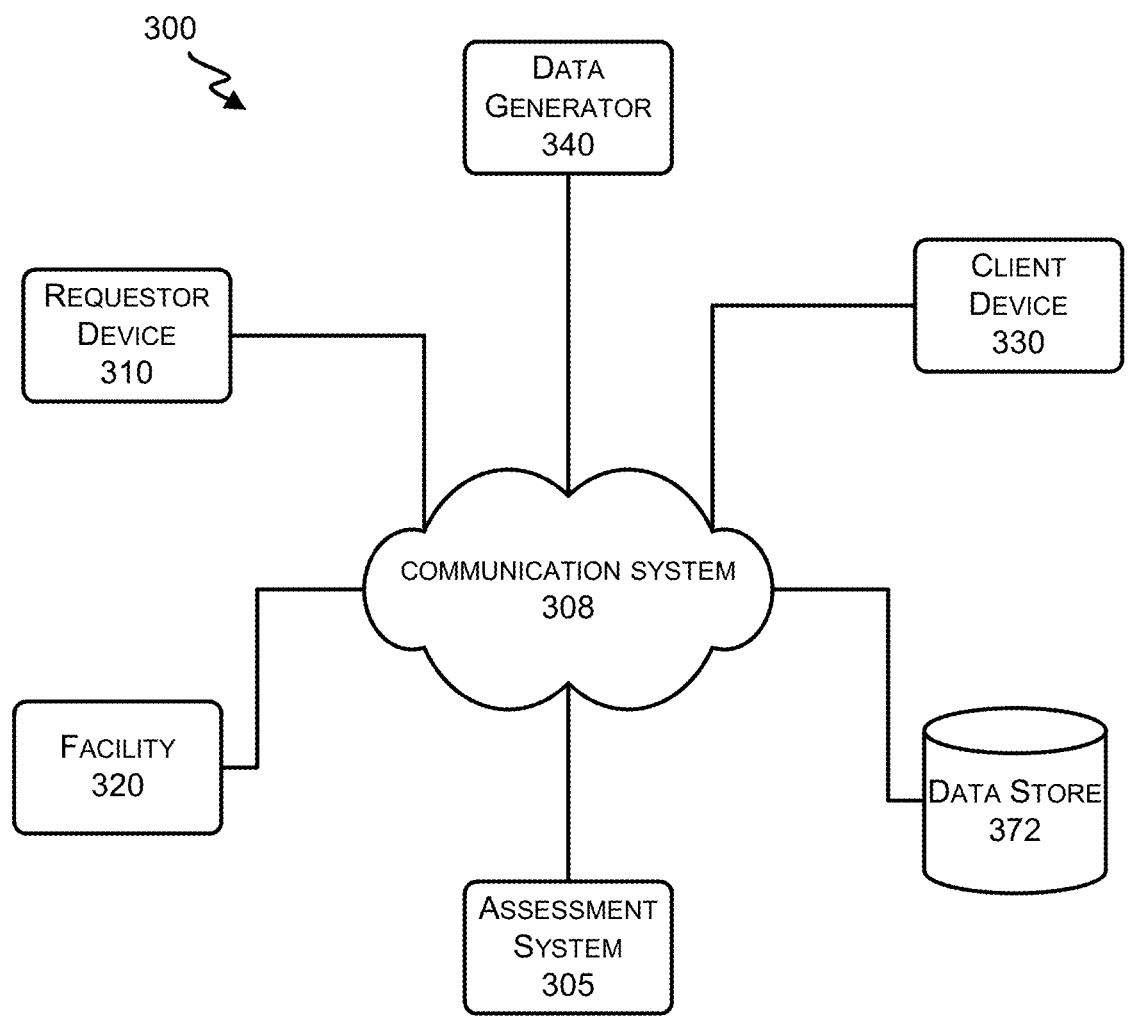
FIG. 3 shows a representation of an example communication network, in accordance with some embodiments.

Referring next to FIG. 3, an assessment network 300 is shown in one embodiment. Assessment network 300 may, but need not, correspond to assessment network 100 shown in FIG. 1. Through the interaction of multiple devices and entities, an assessment system 305 may receive data sets corresponding to individual clients. As illustrated, assessment system 305 may connect, via communication system 308, to each of one or more other systems or devices. Assessment network 300 may also include additional systems or devices, as illustrated in FIG. 3. For example, assessment network 300 may include requestor device 310, facility 320, client device 330, data generator 340, and data store 372, in addition to other systems or devices not explicitly depicted in FIG. 3.

Data may be exchanged between various systems or devices of assessment network, such as by way of communication system 308. Communication system 308 may, for example, include one or more data communication systems or networks, such as a wired or wireless data connection that makes use of or is compliant with one or more Institute of Electrical and Electronics Engineers (IEEE) networking standards, such as 802.3 (Ethernet), 802.11 (Wi-Fi), or 802.16 (WiMAX), or other data communications standards such as IEEE 1394 (FireWire), Bluetooth, Universal Serial Bus (USB), Serial ATA (SATA), Parallel ATA (PATA), Thunderbolt, Fibre Channel, Small Computer System Interface (SCSI), GSM, LTE, etc. Communication system 308 may include one or more TCP/IP compliant interconnections, such as may be present on a private or public communications network, such as the Internet. Communication system 308 may further include servers, systems, and storage devices in the cloud. Communication system 308 may represent or include one or more intermediate systems or data connections between various other components of assessment network 300. Additionally, communication system 308 may represent a direct connection between various other components of assessment network 300, such as a direct connection between assessment system 305 and data store 372, which may optionally allow for communication with data store 372 by other components of assessment network 300 only by way of assessment system 305, for example. It will be appreciated that data store 372 may include one or more data stores, which may optionally be linked or otherwise configured or organized to allow for efficient retrieval and storage of data by reference to different entries in particular data stores or data tables. For example, data store 372 may comprise a relational database or data store, in some embodiments.

One or more of the devices or systems of assessment network 300 may be present at a single location or each may be present at various different locations and be in data communication with one another via communication system 308, depending on the specific configuration. For example, facility 320 and data generator 340 may be at a same location. Requestor device 310 may further be present at facility 320, such as if possessed by a requestor personnel, for example. Similarly, client device 330 may also be present at data generator 340 or facility 320, such as if possessed by a client, for example. In some embodiments, one or more devices or systems of assessment network 300 may be mobile devices, such as a smartphone, tablet computer, laptop, or other compact device, which may facilitate transport between locations or with a user or client. Use of mobile devices may, for example, be advantageous for allowing input to be entered in real-time and/or on request from any location in order to facilitate expedient processing and/or analysis of data or generation of state assessments.

In one instance, assessment system 305 receives a request communication (e.g., via communication system 308) from a requestor device 310 that identifies a client. Client identifying authentication and/or other information can be received from a client device (e.g., which, in some instances, is also requestor device 310). Assessment system 305 may then prime data generator 340 to detect a material associated with the client and generate a set of reads based thereupon.

Upon extracting each read, an alignment process may be performed in which each individual read is aligned with a corresponding portion of a reference data set. In some instances, the alignment process is performed by correlating each individual read with the reference data set and identifying a maximum or above-threshold value of a resulting correlation function. The maximum value or above-threshold value of the correlation function may correspond to a "best fit" or "good fit" location for aligning a particular read with the reference data set. In some instances, a score can be generated for each of one or more portions of the reference data set by comparing identifiers of a read to corresponding identifiers of the portion, and an alignment can be identified based on the score. (For a score may depend on whether each identifier matches a correspond reference-data identifier, is complementary to a corresponding reference-data identifier or neither.) An alignment result may then identify a portion (or characteristic thereof, such as a start and/or stop position of the portion) based on the scores (e.g., to identify a portion with a highest score and/or to identify any portion with a score above a defined threshold). The alignment process may alternatively or additionally include determining the location along the reference data set in which each individual read shares the most elements and/or read values in common with the reference data set.

Each value of a client data set may be determined based on the identified read values of the subset of reads using one of several approaches. In one instance, an average or mode calculation is performed (e.g., value set equal to most common identified read value). In another approach, the identified read values are assigned different weights according to a confidence that a specific read was correctly aligned. For example, reads having greater length and/or having a higher correlation with the reference data set may be given greater weight. In one instance, the length and the correlation of the reads are only determined as a tie-breaking mechanisms when two or more different identified read values are equally common.

Assessment system 305 may detect one or more differences using a client data set, the reference data set, and/or a coverage data set that identifies, for each position of the client data set, a number of aligned reads that overlap with each position. For example, a difference may be identified by detecting a difference, at a given position, between a value (e.g., identifier) of the client data set and a corresponding value of the reference data set. As another example, a difference may be identified by detecting an abrupt change in the coverage data set. A sparse indicator may be defined for each difference to characterize the difference. For example, a sparse indicator may identify a type of difference observed (e.g., what identifier was present in a client data set as opposed to a reference data set or how the coverage data set changed) and a position (e.g., with respect to the reference data set and/or along one or more data-set units) at which the difference was observed.

Each sparse indicator may be assigned to a bucket which may reflect a predicted impact of the detected difference. In some instances, a set of buckets are defined. Each of one, more or all of the buckets may correspond to a predicted likelihood that a client will progress to a given state. A state may include, for example, utilizing a full memory bank, a condition (e.g., medical condition or disease, such as cancer), reduced bandwidth, and/or a connection drop. Thus, buckets may reflect whether and/or a degree to which a difference causes the state (e.g., reflecting memory requirements, whether the difference is (e.g., and/or is likely to be) pathogenic or benign), consumes bandwidth, and/or impairs a connection's stability). For each client, a determination as to how many sparse indicators were assigned to one or more particular buckets may be used to generate a result that identifies a state-progression prediction. The result may be transmitted to requestor device 310 and/or client device 330.

Reads, data sets, sparse indicators, bucket assignments and/or results may be stored (e.g., in association with corresponding client identifiers) in one or more data stores. In some instances, data may be subsequently retrieved for performing an updated assessment (e.g., using a new bucketing protocol or result-generation technique), performing a different type of assessment and/or transmitting data to another device.

In some instances, assessment system 305 is associated with a workflow that includes one or more stages that are defined based on modifiable code. For example, a first stage of the workflow may process reads by aligning the individual reads to a reference data set (e.g., reference genome). The reference data set may include an identifier data set (e.g., a sequence) that identifies a base at each of a set of positions, such as each position along one or more data-set units (e.g., genes). A second stage of the workflow may collectively analyze data corresponding to the aligned reads to generate a client data set (e.g., client sequence). A third stage of the workflow can use the reference data set and client data set to identify sparse indicators (e.g., variants) of the client data set. A fourth stage of the workflow can classify each sparse indicator. A fifth stage can generate a state-transitiuon variable based on the classification(s). To determine run-time impacts of code modifications to the workflow, certain functional testing specifications associated with the workflow may be identified. The functional testing specifications may include a definition of which stages are to be performed during functional testing, a reduced reference data set (containing fewer identifiers than the reference data set), and a reduced set of reads (containing fewer reads than is used during the regular workflow).

A reduced reference data set can have a length along a dimension that is shorter than a corresponding length along the dimension for the reference data set. The reduced reference data set can be defined to be, for example, one or more portions of the reference data set (e.g., which may include concatenated portions) and/or identifiers defined using another protocol (e.g., a space-sampling protocol and/or pseudo-random generation protocol). A reduced set of reads may, but need not, be generated based on actual reads (e.g., from one or more clients or from a library). For example, a reduced set of reads may be defined to be some (e.g., a predefined number) or all of a particular client's reads that were previously aligned (e.g., in its entirety, for at least a predefined, or at least partly) with a portion of the one or more portions of the reduced reference data set included in a reduced reference data set. As another example, a length and target alignment of each read maybe selected based on a Monte Carlo technique and defined distribution, and identifiers of the read may be generated by noise-introduction technique and the portion of the reduced reference data set corresponding to the target alignment.

Prior to fully implementing the code modifications in assessment system 305, a functional testing may be performed according to the functional testing specifications. The functional testing may include performing each of one, more or all stages of the workflow (e.g., only performing the stage for which code was modified, perming the stage for which code was modified and each subsequent stage, or performing all stages) using the reduced reference data set and the reduced set of reads. In some instances, one or more inputs are identified for each stage to facilitate partial workflow testing. For example, alignment data for each read in a reduced read data set may be predefined, which may be input (e.g., in addition to identifiers of each read) to the second stage of the workflow. This may enable a test to skip execution of the first stage (e.g., when a modification has not affected the stage).

One or more results may be generated during the functional testing which may be used to determine whether the code modifications will have an adverse effect on assessment system 305. A result can be generated as a result of processing a single stage or the workflow in its entirety. In some instances, a results can include an intermediate variable that is generally not output (e.g., to a client) as a result of workflow processing and/or that is generally not saved as a result of workflow processing.

The results may include (for example) whether an error occurred, whether a warning was detected, a resource usage corresponding to an amount of processing performed or an amount of memory used, a quantity or percentage of reads that were aligned during the functional testing, a quantity of sparse indicators (e.g., variants) that were detected during the functional testing, an identity or characteristic of each of one, more or all sparse indicators (e.g., type, location, and/or associated identifiers), whether alignment data or sparse-indicator data from the functional testing matches one or more targets (e.g., expected results or results from the regular workflow), a state-transition variable, a number of sparse indicators associated with a given classification, a classification associated with each of one, more or all sparse indicators, and the like. For example, the targets may include certain sparse indicators that are expected to be found over a portion of the reduced reference data set. After determining that the results generated during the functional testing using the code modifications are acceptable (e.g., no errors and/or results reasonably match the targets), the code modifications may be uploaded into a live code associated with assessment system 305.

Figure 4:
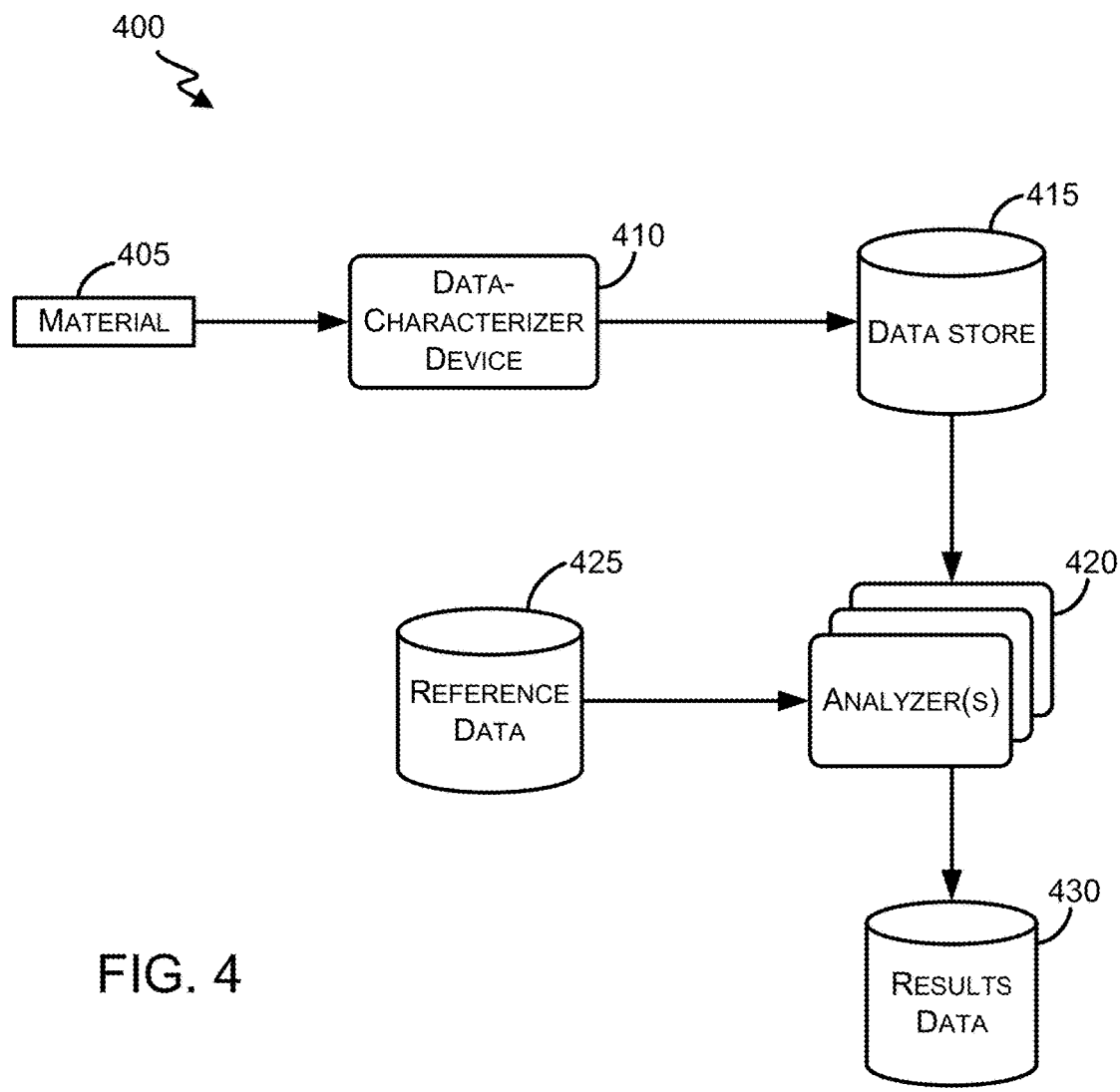
FIG. 4 shows a data flow, in accordance with some embodiments.

Turning next to FIG. 4, a data flow embodiment 400 is shown. Initially, a test material 405 is obtained from a client. As described above, the material 405 may be obtained directly by the client using a collection kit. A client may be able to obtain the material themselves, particularly if the material is easy to collect. Alternatively or additionally, material 405 is obtained at a facility. Obtaining material 405 at a facility may be useful if the material is more difficult to obtain, or if chain-of-custody is a concern.

Material 405 is assessed by a data-characterizer device 410, which may generate a plurality of data sets, including coverage data sets and identifier data sets. As the data sets are determined, they may be stored in data store 415 for subsequent analysis.

Data-characterizer device 410 and data store 415 may be located at a same location, such as a facility. Alternatively, data-characterizer device 410 and data store 415 may be remote from one another. In such a configuration, transmission of data sets from data-characterizer device 410 to data store 415 may occur using any of a variety of data communication standards and/or protocols. In one example, data sets are transmitted from data-characterizer device 410 over a wired and/or wireless network to reach data store 415. In another example, data sets are stored by data-characterizer device 410 directly to a storage medium, such as a flash drive or hard drive, which may be used to facilitate relaying data sets to remote data store 415. Optionally, data store 415 may comprise the storage medium. Data sets stored in data store 415 may be analyzed by data set analyzer 420. Data set analyzer 420 may be located at a same or different location from data-characterizer device 410 and/or data store 415.

Depending on the particular configuration, data sets generated by data-characterizer device 410 and/or stored in data store 415 may be analyzed individually, in real-time as the data sets are produced, or in batches, such as upon completion of a plurality of data sets. Data set analyzer 420 may utilize reference data stored in reference data store 425 in analysis of the data sets generated by data-characterizer device 410 and/or stored in data store 415.

A variety of analyses may be performed on the data sets by data set analyzers 420. For example, data set analyzer 420 may align each read in a data set to a portion of one or more reference sets. Data set analyzer 420 may also generate coverage data and/or identifier data using reads from the data set. Upon completion of the analysis, the information corresponding to the data sets (e.g., coverage data and/or identifier data) and/or alignment indications may be transmitted to and/or stored in one or more results data stores 430, which may correspond to a portion of data store 372.

It will be appreciated that data set analysis may be resource intensive, and thus a plurality of data set analyzers 420 may be used during the analysis process to distribute the resource burden, for example, and/or increase the rate at which data sets may be analyzed. For example, if a plurality of alignments are to be evaluated, such as by determining a potential alignment of an individual data set against multiple reference data sets, it may be desirable to distribute the tasks among multiple data set analyzers 420. Load balancing between a plurality of data set analyzers 420 may be performed to further enhance the use of resources, for example. Additionally, it may be desirable to compare the data sets stored in data store 415 against multiple reference data sets, such as from related family members or from people sharing one or more characteristics, as described above, and comparisons of the data sets with different reference data sets may be performed by different data set analyzers.

Additionally or alternatively, data sets may be analyzed by one or more data set analyzers 420 to identify one or more sparse indicators. Additionally or alternatively, data sets may be analyzed by one or more data set analyzers 420 to categorize each data set, alignment, or detected sparse indicator. Additionally or alternatively, data sets may be analyzed by one or more data set analyzers 420 to score each data set, alignment, or detected sparse indicator. Again, sparse indicators, categories, and scores may be transmitted to and/or stored in results data store 430, which may be included in data store 372.

Detecting sparse indicators may include aligning each data set with a reference data set. The reference data set may include part of a full reference data set and/or may include a data set identified based on identifying median or mode data elements across a plurality of data set derived from samples from a population. In some instances, an alignment is determined to be accurate throughout the client data set, and differences between the client data set and reference data set can be represented as sparse indicators, each corresponding to one or more positions (e.g., relative to an axis of the reference data set or to an axis of the data set). In some instances, a sparse indicator may further be defined using a value or identifier data of the data set (e.g., that differs from a corresponding value in the reference data set). In some instances, a sparse indicator may be defined based on identifying a type of structural difference detected in the data set relative to the reference data set (e.g., duplication, insertion, inversion or deletion). In some instances, an alignment is determined to be accurate throughout part of the data set but not for another part. It may then be determined that such partial alignment is attributable to the client data set, for example, lacking representation of a part of the reference sequence or having an additional set of values. A sparse indicator may therefore identify information corresponding to multiple positions (e.g., reflecting a start and stop of a part of a reference data set not represented in a data set or the converse) and/or multiple values (e.g., reflecting which values were in one of either the reference data set or the data set but not in the other).

In some instances, a state transition likelihood associated with a particular deviation (e.g., sparse indicator) and/or with a combination of deviations is unknown or is associated with a below-threshold confidence. With reference again to FIG. 1 and FIG. 2, upon detecting such a deviation or combination (or a threshold quantity thereof), the particular deviation and/or combination may be identified in a review-request communication 265 and transmitted to an evaluation device 170. Evaluation device 170 may then present the identification to an evaluator 175 and detect input that is indicative of an estimated likelihood to associate with the deviation and/or combination, for example, as part of an optional review analysis process. A review-request response 285 may be transmitted from evaluation device 170 to assessment system 105, for example, to provide the results of any review or input generated by an evaluator 175. The data included in review-request response 285 may be used in report generation process of block 290 and may be included and/or otherwise influence the content of the final report transmitted in report transmission 295.

A result generated by assessment system 105 may include a quantitative or qualitative (e.g., categorical) likelihood variable, such as one corresponding to a transitioning to a particular state. For example, the likelihood variable may include a percentage probability or range of transitioning into a particular state. As another example, the likelihood variable may be partitioned into three categories.

Assessment system 105 may generate an electronic report, at block 290, that includes the result and/or that is selected based on the result. A report communication or transmission 295 may include the report and be transmitted to client 125 or facility 120, such as by way of client device 130 or requestor device 110a. As an example, a report may identify one or more sparse indicators detected in a client data set and/or a bucket of each of one or more sparse indicators. A report may identify a likelihood (e.g., numeric or categorical) of transitioning to a particular state and/or a technique for having generated such a result. A report may identify types of data (e.g., particular data-set units and/or other type of data) used in the analysis. A report may identify a confidence in a result (e.g., a likelihood variable). A report may identify a recommendation (e.g., to contact a requestor or to receive a particular test or evaluation).

In some instances, a report must be approved (e.g., by a requestor 115a or 115b) before it is transmitted to a client device 130. A report-reviewing interface may, but need not, include a configuration to allow a reviewing entity to change or add to the report. A report-reviewing interface may further allow or require a reviewing entity to identify a time at which to send the report to a client.

Assessment system 105 may update and may have access to a variety of data stores, part or all of which may be remote from, co-localized with assessment system 105, and/or included in assessment system 105. One or more of the data stores may include a relational data store, such that data from one data store or structure within a data store may be used to retrieve corresponding data from another data store or structure.

Each of one, more, or all of the data stores may be associated with one or more access constraints. Access constraints applicable to a given data store may be stored as part of the data store or separately (e.g., in an access control data store). Access constraints that apply to one type of data may differ from access constraints that apply to another type of data. For example, account and client data may be associated with stricter access constraints than results data, to make it more difficult for a user, developer, or hacker to be able to link data to a particular individual. An access constraint may identify one or more individuals, devices, systems, and/or occupations permitted to access some or all data in a data store. An access constraint may include a rule, such as one that indicates that a user is permitted to access data pertaining to any of a group of users that the entity was involved in with respect to a transfer of a kit, or that indicates that any low-level authorized user is permitted to access de-identified data but not identifiable data, or that indicates that a high-level authorized user is permitted to access all data. As another example, access constraints may indicate that process data is to be hidden from external developers and available to internal users; that data-set unit, sparse indicator, and data set availability data is to be made available to all authorized external developers and internal users; and that client data is to be availed to authorized internal users and only availed to external developers to the extent to which each corresponding users represented in the data is a user of the developer (e.g., and that the client authorized such data access).

When different access rights apply to different types of data, a query protocol may be established to address instances where a query relates to each type of data. For example, a query may request Variable X for each client corresponding to Data Y, and Variable X and Data Y may correspond to different access constraints. As another example, a query may request a count of clients for which both Data Y and Data Z was detected, and Data Y and Z may correspond to different access constraints. One example of a query protocol is to use a most restrictive overlap of data constraints applying to the query. Another example of a query protocol is to permit use of an at least partly more relaxed access constraint so long as it relates to defining a client set or state and not to results to be returned or processed.

In some instances, an access constraint is configured to inhibit an identification of particular data (e.g., client identity). Such a constraint may relate to a precision of requested data. To illustrate, a constraint may be configured to permit a user to request and receive data identifying client locations, so long as the request is configured to not request too specific of a location and/or so long as the request corresponds to a number of client data elements sufficiently large to obscure (e.g., in a statistical result) a precise location. Compound queries may be more sensitive to potential identification concerns, such that one or more access constraints are configured to permit access to less precise data when multiple data elements are being requested.

Various data stores may be included in assessment networks 100 and 300. The data stores may include, for example, an account data store 176, which may include login credentials for one or more users or clients and/or types of data access to be granted to each user or client; process data store 177, which may identify facility analysis characteristics pertaining to particular data elements (e.g., identifying a facility, piece of equipment, and/or processing time); data sets data store 178, which may identify one or more data sets associated with a given client or material, such as a sample; and one or more data-set expressions or signatures associated with a given client or material, such as a sample. The data stores may further or alternatively include a results data store 181, which may identify one or more sparse indicators identified by and/or one or more results generated by assessment system 105 that are associated with a given client or material, such as a sample.

The data stores may further or alternatively include a reports data store 182, which may include one or more report templates (e.g., each associated with one or more result types) and/or one or more reports to be transmitted or having been transmitted to a client device; and/or a relevance support data store 183, which may identify which types of data (e.g., data-set units, full or partial reference data sets, activity patterns, inputs, records, tests, etc.) are established to be, potentially, established not to be, or unknown whether to be relevant for evaluating a particular type of likelihood (e.g., a likelihood of transitioning into a particular state).

Relevance support data store 183 may include identifications of one or more content objects. The identifications may include, for example, web addresses, journal citations, or article identifiers. In some instances, an identification identifies one or more sources associated with the content object (e.g., scientist, author, journal, or data store). Content objects may be tagged with one or more tags, which may identify, for example, a sparse indicator, a data-set unit, a data set, and/or a type of assessment. In some instances, each of one or more content objects are associated with a score which may reflect a credibility of the content object. The score may be based, for example, on a publication frequency of a source, an impact factor of a source, a date of publication of the content object, and/or a number of citations to the content object.

It will be appreciated that the illustrated data stores 155, 165, 176, 177, 178, 181, 182, and 183 may each, independently and optionally, be included as a portion of data store 372, which may include a relational database, for example.

Assessment network 100 may also include a user device 180 configured to detect input from a user 185. User 185 may be associated with an account or other authentication data indicating that access to some or all of the data is to be granted. Accordingly, user 185 may be able to interact with various interfaces (presented at user device 180) to view data pertaining to one or more particular clients (e.g., in an identified or de-identified manner), to view summary data that relates to data from multiple clients, to explore relationships between data types, and so on. In some instances, an interface may be configured to accept inputs from a user 185 so as to enable the user to request data pertaining to (for example) materials with sparse indicators in particular dataset units, particular sparse indicators and/or state likelihoods.

In some instances, data is transmitted by assessment system 105 and received at user device 180. The transmitted data may relate to durations of work flow processing time periods. Specifically, as may be appreciated by disclosures included herein, generating outputs for users and/or requestors may involve multiple steps, each of which may include a process, which may be referred to herein as a task, of an entity and/or device. Completion times of individual processes may then be monitored and assessed. A work flow may include a structure and definition for these processes. For example, various work flows may include some or all of the following tasks:

- Inputs are collected at client device 130, transmitted by client device 130, and received by assessment system 105, where the inputs correspond to a preliminary request to conduct an assessment based on a material and ensure that all required inputs have been received;
- A same or different client device 130 (e.g., a wearable device) collects and transmits other data indicative of the client's activity or status;
- Inputs collected at requestor device 110a, 110b and transmitted to assessment system 105 that correspond to a request for assessment for the client;
- Access control device 160b at facility 120 collects and transmits record data of the client;
- Distribution device 135 receives alert corresponding to new request and address information and confirms shipping of kit for sample collection to the client;
- Client 125 receives kit, collects material and sends to data generator 140;
- Assessment device(s) 145 collects data-set data, and access control device 160a sends facility data to assessment system 105;
- Assessment system 105 detects any sparse indicators in data set(s) and/or any modifications in data set expression;
- Assessment system 105 assigns any sparse indicators and/or data set availability modifications;
- Evaluation device 170 collects inputs identifying an assignment of any sparse indicators and/or data set availability modifications as of an unknown likelihood;
- Confirmatory facility testing of any sample associated with a sparse indicator and/or data set availability modification having a particular assignment at same or different facilities;
- Assessment system 105 aggregates sparse indicator data, assignment data, record data, user or client inputs, other data, and/or activity or status data and generates one or more likelihood variables;
- Assessment system 105 generates electronic report with the one or more likelihood variables;
- Evaluation device 170 and/or requestor device 110a collect inputs indicating that the electronic report is approved for transmission to client device 130; and
- Assessment system 105 transmits the electronic report to client device 130.

A work flow may include a task order that indicates that, for example, a first task is to be completed prior to performance of a second task, though a work flow may alternatively be configured such that at least some tasks may be performed in parallel. In some instances, one or more tasks in a work flow are conditional tasks that need not be performed during each iteration of the work flow. Rather, whether a conditional task is to be performed may depend on a circumstance, such as whether a result from a prior task is of a particular type or exceeds a threshold.

Using a work flow, assessment system 105 may track timing of individual tasks during individual iterations of a work flow. Each iteration may correspond to generating a likelihood variable for a given client and may involve various other entities (e.g., reviewers, facilities, etc.), which may be selected based on, for example, user preference, a physical location of a client device, and/or availability. For tasks performed at assessment system 105, timing may be directly determined. For tasks performed by, at, and/or via another device, assessment system 105 may track timing via electronic transmissions between systems. For example, a start may be identified by an instruction communication sent from assessment system 105 and/or a when a communication was received indicating that the corresponding task was beginning. As another example, an end time may be identified by transmission of a communication including a result of the corresponding task sent from assessment system 105 and/or when a communication was received indicating that the corresponding task was complete.

Figure 5:
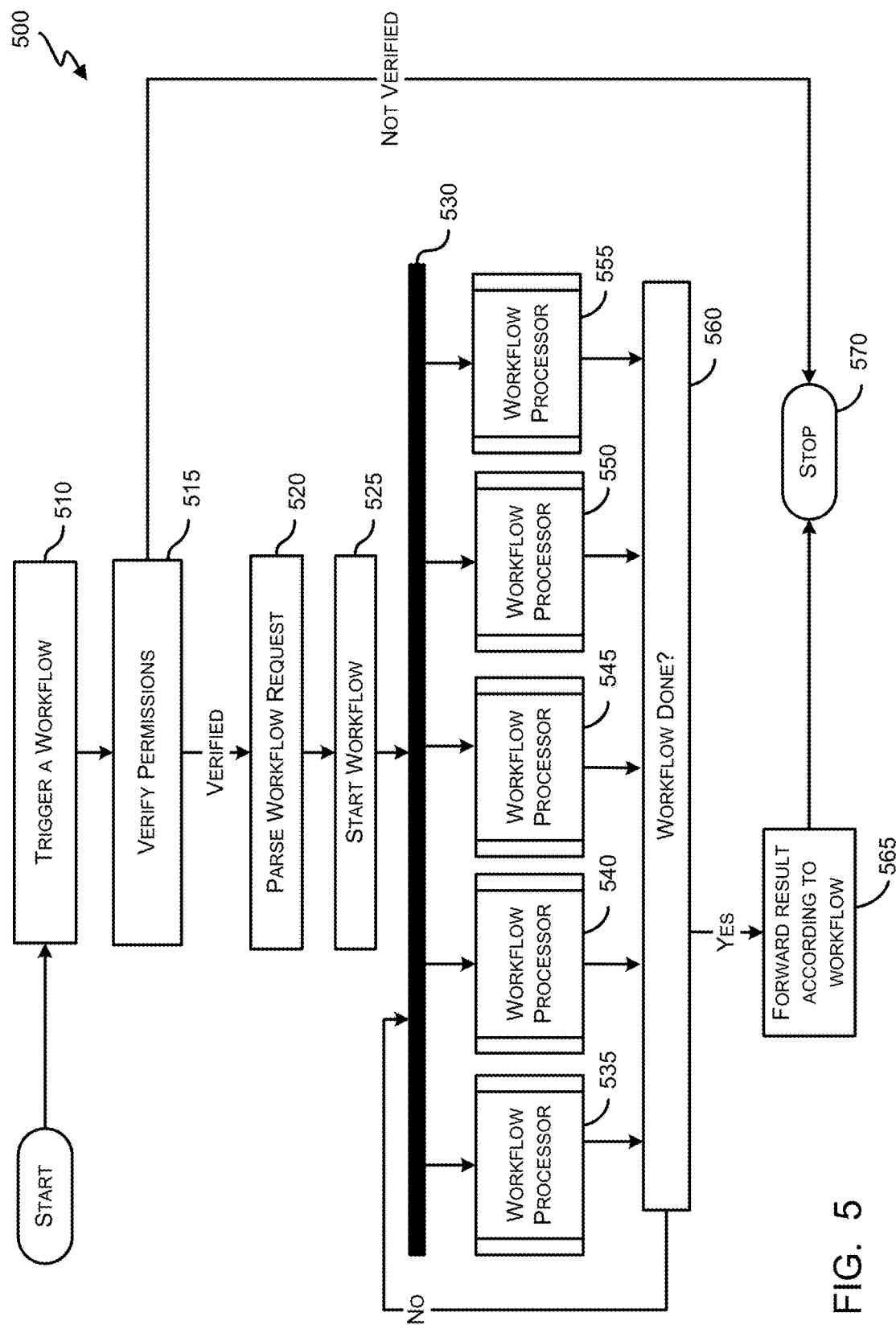
FIG. 5 shows an illustration of a work flow iteration, in accordance with some embodiments.

FIG. 5 shows a representation of an embodiment of a process 500 for processing tasks in the assessment network 100. The process starts when an event triggers a first work flow as shown at block 510. Any number of events occurring internal to the assessment network 100 and external to the assessment network 100 may trigger a first work flow in any number of ways. Each of the assessment system 105, a requestor device 110, a client device 130, a distribution device 135, a facility data generator, an evaluation device 170, a user device 180, and an external assessment device 190 may trigger a work flow, for example. For instance, the assessment system 105 may trigger a work flow when it receives an electronic request 205. A requestor device 110 may trigger a work flow by transmitting electronic request 205. A user device may trigger a work flow based on inputs collected. A data generator 140 may trigger a work flow upon receipt of a sample. Other examples are possible and it will be appreciated from the present description that any one or more data transmissions between various devices and systems of assessment network 100 may trigger a work flow. It will also be appreciated that various work flows may initiated sequentially or simultaneously, depending on the particular need for completion of one work flow to complete before another work flow may begin. In addition, additional work flows may be triggered while in the midst of processing one work flow. In some embodiments, an assessment system or assessment device manages and/or coordinates triggered work flows. Optionally, task start times may be tracked, as described above, and triggering a work flow may include tracking the start time of tasks associated with the work flow.

Some task work flows may require verification of permissions and/or authorizations, such as depicted at block 515, before the work flow is permitted to begin. For example, a transmission of record data of a client may require explicit authorization from a client or a requestor before the transmission may begin, for example, due to the sensitivity of information that may be included in the record data. As another example, transmission of information of a client to an external assessment device may also require client permission. In this way, permission verification may prevent unanticipated or unauthorized transmission of information to a particular work flow processor for which such transmission may be undesirable. Timing of permission request and verification may further be tracked, such as to allow identification of bottlenecks in work flow and/or task processing associated with permission verification. U.S. patent application Ser. No. 15/133,089, filed on Apr. 19, 2016 and U.S. Provisional Applications 62/150,218, filed on Apr. 20, 2016, and 62/274,660, filed on Jan. 4, 2016, disclose details regarding various work flow processes, and are each hereby incorporated by reference in its entirety for all purposes.

As illustrated in FIG. 5, if permissions are not verified, the work flow may be stopped, at block 570. If permissions are verified, the work flow may proceed to block 520. It will be appreciated that not all work flows require permission verification, and so block 515 may be considered to be optional.

Depending on the particular work flow initiated, the work flow request may require parsing, at block 520, to ensure that various portions of the work flow may be handled appropriately. Parsing may include determining that all required inputs, data, and/or materials needed for completing the work flow are available. In the event that additional inputs, data, and/or materials are needed, the work flow may be returned to the triggering device to request the additional inputs, data, and/or materials, for example. Parsing may also include aspects of load-balancing. Parsing may also include, for example, analyzing the work flow request and associated data and/or materials to ensure the data, materials and/or multiple individual sub-work flow processes are directed to an appropriate work flow processor 535, 540, 545, 550, 555, etc. Task start times may optionally be tracked based on completion of parsing a work flow request, for example.

In one embodiment, a work flow may correspond to performing a data set analysis on a sample, which may include dividing the sample into sub-samples. The sub-samples may, for example, be redundantly analyzed to ensure accuracy. Parsing 520 may include identifying necessary resources for completing a particular work flow.

After parsing the work flow request, the triggered work flow is started, at block 525. Optionally, synchronizer 530 oversees the processing of individual work flow processes by work flow processors. Optionally, tracked task start times may correspond to times at which the triggered work flow is actually passed to a work flow processor.

Some task work flows may include multiple individual work flow processes, such as a sequencing work flow for sequencing data-set unit data or sparse indicator data from a sample, where each individual work flow process may correspond to, for example, one or more data sets. These individual work flow processes may be performed in series, for example, such as if a particular work flow process requires input from a previous work flow process. The individual work flow processes may alternatively be performed in parallel, for example, if the separate work flow processes do not rely on an a result from another work flow process that may be performed simultaneously. Additionally, individual work flow processes may be started and completed without regard to other work flow processes that may be operating. Upon a work flow processor 535, 540, 545, 550, 555 completing the designated tasks, at 560, the work flow may be evaluated to determine whether the work flow is completed. If additional processing is required, the work flow may return to synchronizer 530 for appropriate queuing. If no additional processing is required, the work flow result may be forwarded as appropriate, at 565. Once a particular work flow is forwarded, the task associated with the work flow may stop, at block 570. Optionally, task stop or end times may be tracked based on the time at which a work flow proceeds to stop at block 570.

Assessment system 105 may store task start and completion times, and/or task completion time periods (i.e., a difference between corresponding task completion and task start times) in process data store 177 in association with an identifier of the corresponding task and an identifier of a corresponding work flow iteration (e.g., an identifier of a client or sample). Assessment system 105 may collect task start and completion times that correspond, for example, to a given time period, facility, user or client group, analysis type, etc. and analyze the data at a population level. Through such analysis, assessment system 105 may identify average, median, or mode completion time periods for individual tasks so as to identify tasks, facilities, or entities associated with work flow processing delay. Further or alternatively, assessment system 105 may identify a backlog for individual tasks by identifying a number of "open" tasks for which a start time has been identified but for which no completion time is identified. Tasks, facilities, and/or entities associated with high backlog may then be identified.

Such task completion time monitoring may be performed automatically and/or in response to a query communication from user device 180. For example, assessment system 105 may determine, for each handling entity (e.g., facility, distribution device, reviewer, or facility) a portion of tasks completed by a first threshold time identified for a given task. Upon detecting that the portion exceeds a second threshold, an alert communication may be transmitted to user device 180 and/or a device of an associated entity. As another example, assessment system 105 may present a statistic (e.g., mean) corresponding to a processing time of each task in a work flow. The presentation may be interactive, such that more details about a statistic may be presented in response to a user selection of the statistic. For example, the statistic may be broken down by entity and/or task start time period, or more detailed information (e.g., a distribution or list of start and completion times) may be presented.

In some instances, data transmitted from assessment system 105 to user device 180 may relate to data queries received from user device 180. The query may, in some instances, include one that specifically or implicitly identifies one or more data-set units. For example, identification of a given kit or assessment may be associated with one or more data-set units. Assessment system 105 may identify data that any access constraints indicate are accessible to the user, and present high-level population data. For example, assessment system 105 may identify a portion of clients for which any sparse indicator or a particular sparse indicator was detected at each of the one or more data-set units. Such data may be presented in an interactive manner, such that a user may select a represented portion of the data to drill down into that data. For example, the interface may accept a selection of a representation of each data-set unit, and the interface may be updated to identify a distribution of particular sparse indicators detected at the data-set unit.

A drill-down may be configured to, at some level, begin representing non-data set data. For example, a selection of a particular sparse indicator or data-set unit may result in a display identifying a distribution of history data or demographic data from amongst clients associated with the particular sparse indicator or a sparse indicator at the data-set unit. Thus, the drill-down may include retrieving data from different data stores depending on a level of precision. Further, each step in the drill-down may involve evaluating one or more applicable access constraints.

In some instances, a query may pertain to one or more data-set units, and query processing may include retrieving data (or results derived therefrom) and retrieving data set availability data (or results derived therefrom). For example, query processing may include identifying, for each subject and for each of the one or more data-set units, whether a sparse indicator or an data set availability modification was detected. A query result presentation may identify, for example, a portion of subjects for which a sparse indicator or modification was detected for each of the data-set units and/or a query result presentation may identify, for each of the one or more data-set units, a portion of subjects or clients for which a particular type of sparse indicator or modification was detected. The presentation may again be configured to accept drill-down inputs so as to enable a user to further explore the pertinent data.

As another example, query processing may include identifying instances in which, for a given client, both a sparse indicator (e.g., generally or of a particular type) and an data set availability modification (e.g., generally or of a particular type) was detected (e.g., generally, at a particular data-set unit and/or at a particular position at a data-set unit).

Again with reference to FIG. 1, assessment network 100 may also include an external assessment device 190 configured to detect input from a developer 195. Via such inputs, external assessment device 190 may send electronic requests for data (e.g., relating to particular data-set units, a particular user or client and/or particular user or client inputs) to assessment system 105. The inputs may be received, for example, via a webpage, application, or app page, which may identify general types of data that is available for restricted access. Assessment system 105 may evaluate the request to determine, for example, whether a corresponding client 125 authorized such access (which may be verified via a communication exchange between assessment system 105 and client device 130) and/or whether such access is relevant to a purported type of analysis.

The evaluation may include assessing one or more permissions associated with a given user or client. In various instances, a permission may be set to be conditioned upon an entity or system transmitting a request, a type of data being requested, a size of data being requested, or a potential type of processing identified as being a use for the data. For example, a client may specify that an external assessment device may be granted access to data, such as data that includes data sets or sparse indicator detections, if the requested data pertains to fewer than a first threshold number of data-set units, that access to data that includes sparse indicator detection may be granted if the requested data pertains to fewer than a second threshold number of data-set units, and that access to the data is to be otherwise restricted.

Evaluation processing may depend, in part, on whether a system or entity associated with a request has provided any data previously or presently and/or what type of data is being provided. For example, external assessment devices and/or associated systems may provide data (e.g., generated from an external facility and/or client sample), results data, input data, data set availability data, test data, and/or history data.

Evaluation processing may depend on one or more permissions or restrictions associated with a request. The permissions or restrictions may be set, for example, based on client input, or lack thereof, and/or based on which type of analysis and/or data storage was initially agreed to by a client. For example, an interface may be configured so as to enable a user or client to permit or restrict storage of particular types of data (e.g., data sets and/or sparse indicator detection beyond what is needed to perform a requested analysis), to permit or restrict sharing data to one or more other entities (e.g., generally, of a given type or specific entities), and/or to permit or restrict using data to perform one or more other types of analyses. Permissions or restrictions pertaining to whether various analyses may be particularly important given that rules or regulations may require particular results of analyses to be transmitted to a client. Thus, if such information is not desired, analyses must be restricted.

In some instances, an interface may be configured to enable a user or client to specify a degree of identification to be associated with data of the client with regard to storage and/or distribution. For example, a user or client may be able to indicate that data and/or results are to be associated with a pseudo-randomly generated unique identifier of the client rather than client identifying information. As another example, a client may be able to indicate that data is to be stored so as to require a key for access, which may be held by the client. As another example, a client may authorize transmission of the client's data to external assessment devices so long as identifying information of the client (e.g., name, email, address, social security number, phone number, and so on) is not provided without subsequent explicit permission.

In some instances, a same or different permission may be established to apply to other type of data (e.g., with regard to storage and/or distribution), such as personal data, inputs and/or sensor data. In some instances, a same or different permission may be established so as to relate to data collected from external systems. For example, a permission may indicate whether an assessment system is authorized to request physician-system data (and/or what type of data), an external assessment device-data, etc., and/or how an assessment is to handle results provided by an external system.

If the evaluation indicates that access is to be granted, assessment system 105 may, for example, send an instruction communication to data generator 140 to conduct a new analysis of an existing sample, send a data request to a device (e.g., access control device 160*b*, client device 130), and/or retrieve data from a data store (e.g., and extract pertinent information from any larger data structure, such as extracting data-set unit-specific data from a reference dataset). When part or all of the data is accessible, one or more communications may be transmitted to the developer. The one or more meetings may include the data and/or may include information (e.g., access credentials, login information, or ftp IP address and credential information) to enable the developer to access the data. In some instances, other data different from that which was requested may be provided. The other data may include, for example, quality control metrics of the provided data, other data determined to be relevant to an analysis, and/or other data that is being provided in lieu part or all of data that had been requested.

Various devices in assessment network 100 may communicate with one or more other devices in assessment network 100 via a network, such as a communication system, the Internet, a local-area network, or a short-range network. Communications may be sent in a secure manner to, e.g., inhibit unauthorized access to health-record data. Techniques such as token authentication and/or encryption may be used.

It will be appreciated that the representations of devices and configurations depicted in FIGS. 1, 2, and 3 are illustrative. For example, while a single data generator 140, client device 130, and data stores 178, etc., are shown, a system may include multiple data generators 140, client devices 130, data store 178, etc. As another example, while access control devices 160a, 160b are shown as being connected to data store 155 and record data store 165, additional access control devices may be present in assessment network 100. For example, an access control device 105 may be included within or connected to assessment system 105 so as to control access that requestor device 110b, client device 130, distribution device 135, evaluation device 170, user device 180 and/or external assessment device 190 may achieve.

Figure 6:
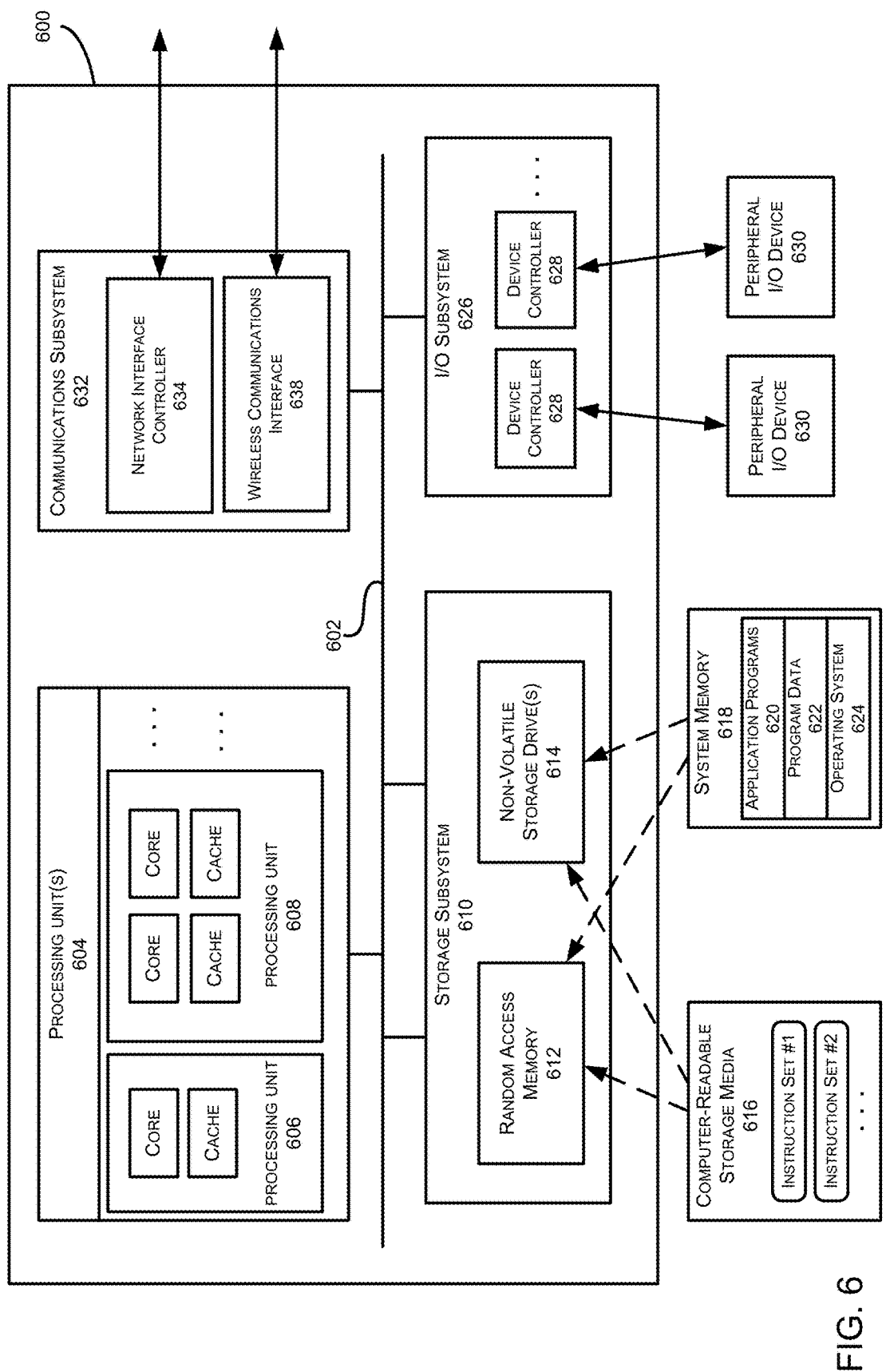
FIG. 6 shows a block diagram of an example data processing network device or system, in accordance with some embodiments.

With reference now to FIG. 6, a block diagram of an illustrative assessment network device 600 is shown. The device 600 may correspond to any of the devices or systems of the assessment network 100 described above, or any other computing devices described herein, and specifically may include, for example, one or several of an assessment system 105, a requestor device 110, a client device 130, a distribution device 135, an assessment device 145, a technician device 150, an access control device 160a, a reviewer device 180, an external assessment device 190, external system 249, data-characterizer device 410, data set analyzer 420, and/or any of the work flow processors 535, 540, 545, 550, and 555. Aspects of device 600 may further be incorporated in one or more of data stores 155, 165, 176, 177, 178, 181, 182, 183, 415, 425, and 430 and data store 372. It will be appreciated that each of the devices referred to that may correspond to an instance of device 600 may be independent and unique from all other instances of device 600 and may include fewer or additional components as those illustrated in FIG. 6.

In the example illustrated in FIG. 6, device 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of device 600 communicate with each other. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard.

Processing unit 604, which may be implemented as one or more integrated circuits (e.g., a conventional microprocessor or microcontroller), controls the operation of device 600. Processing unit 604 may be implemented as a special purpose processor, such an application-specific integrated circuit, which may be customized for a particular use and not usable for general-purpose use. One or more processors, including single core and/or multicore processors, may be included in processing unit 604. As shown in FIG. 6, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater).

Processing unit 604 may execute a variety of software processes embodied in program code, and may maintain multiple concurrently executing programs or processes. At any given time, some or all of the program code to be executed may be resident in processor(s) 604 and/or in storage subsystem 610. In some embodiments, device 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with device 600 (e.g., integrated audio/video systems, and/or touchscreen displays), or may be separate peripheral devices which are attachable/detachable from device 600. The I/O subsystem 626 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, haptic devices, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, haptic devices, and the like. In general, use of the term "output device" is intended to include all possible types of devices and mechanisms for outputting information from device 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Device 600 may comprise one or more storage subsystems 610, comprising hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs. Program instructions may include instructions to perform one or more actions or part(s) or all of one or more methods or processes described herein. For example, program instructions may include instructions for identifying and/or aligning sparse indicators. Program instructions may include instructions for generating, transmitting, and/or receiving communications. Program instructions may include instructions for automated processing. Program instructions may include instructions for generating automated processing and/or stage results. Program instructions may include instructions for performing a work flow iteration.

Depending on the configuration and type of device 600, system memory 618 may be stored in volatile memory (such as random access memory (RAM) 512) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within device 600, such as during start-up, may typically be stored in the non-volatile storage drives 614. By way of example, and not limitation, system memory 618 may include application programs 620, such as user applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 610 may also include a computer-readable storage media reader that may further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This may include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This may also include nontangible computer-readable media, such as data signals, data transmissions, or any other medium that may be used to transmit the desired information and that may be accessed by device 600.

By way of example, computer-readable storage media 616 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray disk, or other optical media. Computer-readable storage media 616 may include, but is not limited to, Zip drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for device 600.

Communications subsystem 632 may provide a communication interface from device 600 and remote computing devices via one or more communication networks, including local area networks (LANs), wide area networks (WANs) (e.g., the Internet), and various wireless telecommunications networks. As illustrated in FIG. 6, the communications subsystem 632 may include, for example, one or more network interface controllers (NICs) 634, such as Ethernet cards, Asynchronous Transfer Mode NICs, Token Ring NICs, and the like, as well as one or more wireless communications interfaces 638, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire interfaces, USB interfaces, and the like. Communications subsystem 632 also may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components.

The various physical components of the communications subsystem 632 may be detachable components coupled to the device 600 via a computer network, a FireWire bus, a serial bus, or the like, and/or may be physically integrated onto a motherboard or circuit board of device 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access device 600. For example, communications subsystem 632 may be configured to receive data feeds in real-time from other communication services, web feeds such as Rich Site Summary (RSS) feeds, and/or real-time updates from one or more third party information sources. Additionally, communications subsystem 632 may be configured to receive data in the form of continuous data streams, which may include event streams of real-time events and/or event updates (e.g., data set completion, results transmission, other data transmission, report transmission, etc.). Communications subsystem 632 may output such structured and/or unstructured data feeds, event streams, event updates, and the like to one or more data stores that may be in communication with device 600.

Due to the ever-changing nature of computers and networks, the description of device 600 depicted in FIG. 6 is intended only as a specific example. Many other configurations having more or fewer components than the device depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, it will be appreciated that there are other ways and/or methods to implement the various embodiments.

Figure 7:
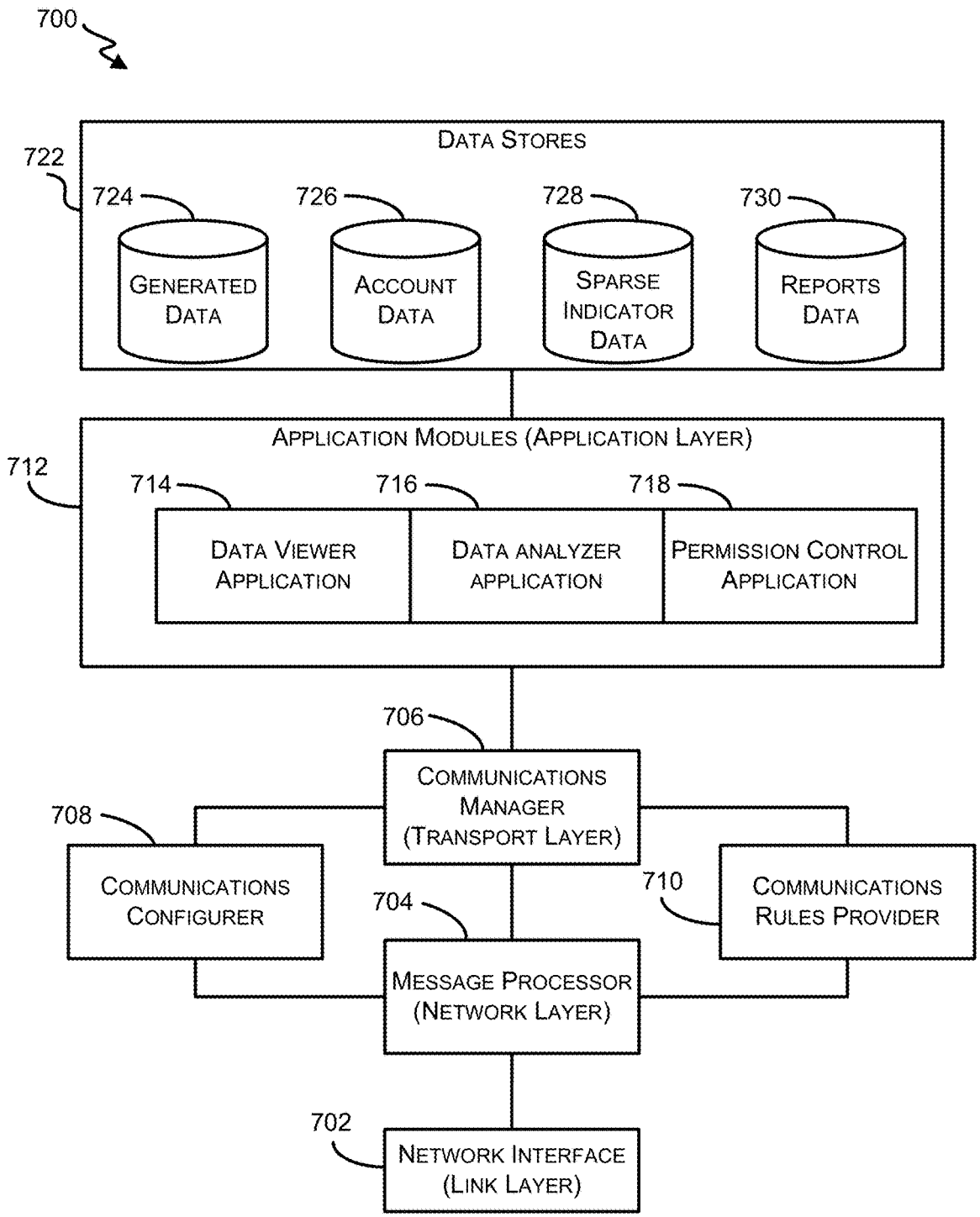
FIG. 7 illustrates components of a data processing network device or system, in accordance with some embodiments.

With reference now to FIG. 7, a diagram of components of an illustrative assessment network device 700 is shown. The device 700 may correspond to any of the devices or systems of the assessment network 100 described above, or any other computing devices described herein, and specifically may include, for example, one or several of an assessment system 105, a requestor device 110, a client device 130, a distribution device 135, an assessment device 145, a technician device 150, an access control device 160a, a reviewer device 180, an external assessment device 190, external system 249, data-characterizer device 410, data set analyzer 420, any of the work flow processors 535, 540, 545, 550, and 555, and/or device 600. Aspects of device 700 may further be incorporated in one or more of data stores 155, 165, 176, 177, 178, 181, 182, 183, 415, 425, and 430, and data store 372. It will be appreciated that each of the devices referred to that may correspond to an instance of device 700 may be independent and unique from all other instances of device 700 and may include fewer or additional components as those illustrated in FIG. 7.

Various components may be included in device 700. Components may include some or all of the following: a network interface 702 (which may operate in or function as a link layer of a protocol stack), a message processor 704 (which may operate in or function as a network layer of a protocol stack), a communications manager 706 (which may operate in or function as a transport layer of a protocol stack), a communications configurer 708 (which may operate in or function as a portion of transport and/or network layer in a protocol stack), a communications rules provider 710 (which may operate in or function as part of a transport and/or network layer in a protocol stack), and applications 712 (which may operate in or function as an application layer of a protocol stack).

Network interface 702 receives and transmits messages via one or more hardware components that provide a link-layer interconnect. The hardware components associated with network interface 702 may include, for example, a radio frequency (RF) antenna or a port (e.g., Ethernet port) and supporting circuitry. In some embodiments, network interface 702 may be configured to support wireless communication, e.g., using Wi-Fi (IEEE 802.11 family standards), Bluetooth, or other wireless communications standards.

The RF antenna, if present, may be configured to convert electric signals into radio and/or magnetic signals (e.g., to radio waves) to transmit to another device and/or to receive radio and/or magnetic signals and convert them to electric signals. RF antenna may be tuned to operate within a particular frequency band. In some instances, device 700 includes multiple antennas, and the antennas may be, for example, physically separated. In some instances, antennas differ with respect to radiation patterns, polarizations, take-off angle gain and/or tuning bands. Network interface 702 may include one or more phase shifters, filters, attenuators, amplifiers, switches and/or other components to demodulate received signals, coordinate signal transmission and/or facilitate high-quality signal transmission and receipt using the RF antenna.

In some instances, network interface 702 includes a virtual network interface, so as to enable the device to utilize an intermediate device for signal transmission or reception. For example, network interface 702 may include or utilize virtual private networking (VPN) software.

Network interface 702 may be configured to transmit and receive signals over one or more connection types. For example, network interface may be configured to transmit and receive Wi-Fi signals, Ethernet signals, cellular signals, Bluetooth signals, etc.

Message processor 704 may coordinate communication with other electronic devices or systems, such as one or more user devices, requestor devices, assessment systems, data stores, assessment devices, distribution device, reviewer device, etc. In one instance, message processor 704 is able to communicate using a plurality of protocols (e.g., any known, future and/or convenient protocol such as, but not limited to, internet protocol (IP), short message service, (SMS), multimedia message service (MMS), etc.). Message processor 704 may further optionally serialize incoming and/or outgoing messages and facilitate queuing of incoming and outgoing message traffic.

Message processor 704 may perform functions of an Internet or network layer in a network protocol stack. For example, in some instances, message processor 704 may format data packets or segments, combine data packet fragments, fragment data packets and/or identify destination applications and/or device addresses. For example, message processor 704 may defragment and analyze an incoming message to determine whether it is to be forwarded to another device and, if so, may address and fragment the message before sending it to the network interface 702 to be transmitted. As another example, message processor 704 may defragment and analyze an incoming message to identify a destination application that is to receive the message and may then direct the message (e.g., via a transport layer) to the application.

Communications manager 706 may implement transport-layer functions. For example, communications manager 706 may identify a transport protocol for an outgoing message (e.g., transmission control protocol (TCP) or user diagram protocol (UDP)) and appropriately encapsulate the message into transport protocol data units. Message processor 704 may initiate establishment of connections between devices, monitor transmissions failures, control data transmission rates, and monitor transmission quality. As another example, communications manager 706 may read a header of an incoming message to identify an application layer protocol used to receive the message's data. The data may be separated from the header and sent to the appropriate application. Message processor 704 may also monitor the quality of incoming messages, detect out of order incoming packets, detect missing packets, reorder out of order packets, request retransmission of missing packets, request retransmission of out of order packets, etc.

In some instances, characteristics of message-receipt or message-transmission quality may be used to identify a quality status of an established communications link. In some instances, communications manager 706 may be configured to detect signals indicating the stability of an established communications link (e.g., a periodic signal from the other device system, which if received without dropouts, indicates a stable link).

In some instances, a communication configurer 708 is provided to track attributes of another system so as to facilitate establishment of a communication session. In one embodiment, communication configurer 708 further ensures that inter-device communications are conducted in accordance with the identified communication attributes and/or rules. Communication configurer 708 may maintain an updated record of the communication attributes of one or more devices or systems. In one embodiment, communications configurer 708 ensures that communications manager 706 may deliver the payload provided by message processor 704 to the destination (e.g., by ensuring that the correct protocol corresponding to the receiving system is used). Optionally, communications configurer 708 may reformat, encapsulate, or otherwise modify the messages directed to the message processor 704 to ensure that the message processor 704 is able to adequately facilitate transmission of the messages to their ultimate destination.

A communications rules provider 710 may implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule may identify a technique for selecting between a set of potential destination devices based on attributes of the set of potential destination devices as tracked by communication configure 708. To illustrate, a device having a short response latency may be selected as a destination device. As another example, communications rules provider 710 may maintain associations between various devices or systems and resources. Thus, messages corresponding to particular resources may be selectively transmitted to destinations having access to such resources.

A variety of applications 712 may be configured to initiate message transmission, process incoming transmissions, facilitate permissions requests for access to protected data, facilitate automatic access to protected data, facilitate task work flow permission verification, and/or performing other functions. In the instance depicted in FIG. 7, application modules 712 include a data viewer application 714, a data analyzer application 716, and/or a permission control application 718. It will be appreciated that the application modules depicted in FIG. 7 are merely examples and other example application modules are include, but are not limited to, one that is associated with aspects of part or all of each of one or more actions, methods, and/or processes disclosed herein.

Data stores 722 may store data for use by application modules 712, as necessary, and may include, for example, generated data store 724, account data store 726, sparse indicator data store 728, and reports data store 730. Optionally, data store 372 may be included in data stores 722. It will be appreciated that fewer or more or different data stores than those illustrated in FIG. 7 may be included in data stores 722, such as any one or more of data stores 155, 165, 176, 177, 178, 181, 182, and 183 depicted in FIG. 1.

One or more of data stores 724, 726, 728, and 730 may be a relational data store, such that elements in one data store may be referenced within another data store. For example, account data store 726 may associate an identifier of a particular account with an identifier of a particular user or client. Additional information about the user may then be retrieved by looking up the account identifier in sparse indicator data store 728, for example.

The components illustrated in FIG. 7 may be useful for establishing data communications and exchanging data between various other systems. For example, independent instances of device 700 may represent the requestor device 110 and the assessment system 105 illustrated in FIGS. 1 and 2. Other examples are possible.

As an example, data analyzer application 716 may perform alignment of data sets, request reference data, determine sparse indicators, determine scores, determine buckets, etc. Such actions may be performed in response to messages received by device 700 from another instance of device 700. If data that is unavailable locally in device 700 is needed by an application module 712, a request may be transmitted by device 700, first by generating the request, forwarding the request to communications manager 706, which then may process and modify the request as necessary for subsequent handling by message processor 704. In turn, message processor 704 may process and modify the request as necessary, such as by adding header and/or footer information, for subsequent handling by network interface 702. Network interface 702 may then perform further processing and modification of the request, such as by adding additional header and/or footer information, and then facilitate transmission of the request to a remote system, such as an external system that may possess the needed data.

Figure 8:
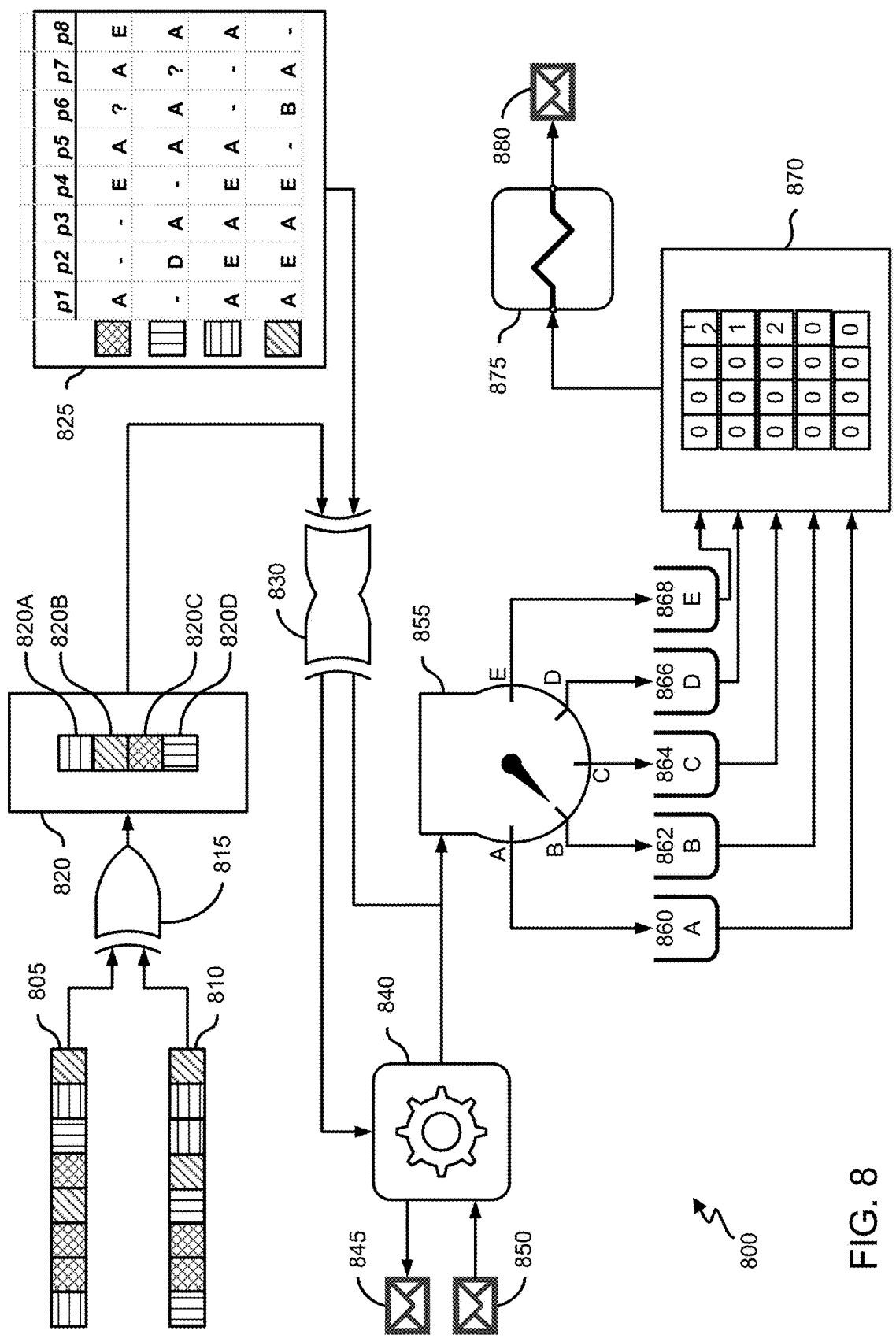
FIG. 8 shows a representation of a system for generating communications, in accordance with some embodiments.

Referring next to FIG. 8, a representation of a system 800 for assigning sparse indicators to data buckets is shown, such as by performing a work flow iteration(s), performing automated processing for stage(s), generating stage result(s) from one or more stages of a work flow, and analyzing data buckets. System 800 may represent portions of assessment system 105 and may, for example, include portions of data generator 140. System 800 may be in data communication with one or more other components of assessment network 100 or 300, such as client device 130 and data store 372, for example.

System 800 includes an assessment device 815, which may be used to analyze and/or compare generated data 805 with reference data 810 to generate a data stream 820, which may include one or more sparse indicators 820A, 820B, 820C, 820D, etc. Thus, it will be appreciated that data 805 may include data aligned with a portion of a reference set, such that individual values of data 805 may be compared to corresponding values in reference data 810. In some embodiments, multiple individual data sets are obtained for a particular client and a compiled data set may be assembled from alignments of a plurality of the individual data sets. The compiled data set may be compared with one or more reference data sets or a compiled reference data set to identify sparse indicators associated with the compiled data set for the particular client. It will also be appreciated that generated data 805 may include identifier data and coverage data that may be used by assessment device 815 in generating data stream 820, such as by comparing identifier data with reference data 810 and using coverage data in tandem to determine a type, identity, value, and/or confidence metric associated with a sparse indicator in data stream 820.

Different types of sparse indicators may be identified, such as a one-element sparse indicator representing a single data element different from a reference data set, or a clustered sparse indicator representing a set of consecutive data elements different from a reference data set. A clustered sparse indicator may be detected upon determining (for example) that a series of elements in a data set generally differ from those in a reference data set or that values in a coverage set change across the set so as to indicate that a portion of the reference data set is over- or underrepresented in the data set. Thus, in some instances, a reference set may include a reference coverage set. Although only four sparse indicators 820A-820D are depicted as part of data stream 820, it will be appreciated that more or fewer sparse indicators may be identified for a particular set of generated data and that the four sparse indicators 820A-820D are merely examples.

System 800 further includes a look-up engine 830, which may determine whether each individual sparse indicator corresponds to bucket-assignment data in stored data 825 (e.g., a look-up table). For example, a look-up table may include a set of entries, each of which corresponds to a sparse indicator. A sparse indicator may be identified (for example) by a position and identifier or by a range of positions and type of sparse identifier (e.g., type of structural sparse identifier and/or one or more corresponding position ranges in a reference data set). For example, FIG. 8 illustrates stored data 825 arranged in a table or array, such that a value along a first dimension can represent an identifier detected in a client data set and a value along a second dimension can represent a position at which the identifier was detected. Elements that correspond to those in a reference data set need not have a value. Each of one or more other elements may include bucket-assignment data, which may identify a bucket to which the sparse indicator is to be assigned and, in some instances, a confidence of such assignment. In some instances, one or more elements indicate that bucket-assignment data is not yet available).

The depicted stored data 825 may be useful for identifying bucket-assignment data for sparse indicators corresponding to differences between a client data set and reference data set at individual positions. It will be appreciated that additional stored data 825 may identify bucket-assignment for other types of sparse indicators (e.g., structural sparse indicators), such as a sparse indicator that indicates that elements from Position X to Position Y are not present in a client data set.

If a look-up of a particular sparse indicator is successful, look-up engine 830 may proceed to assign the sparse indicator in accordance with the bucket-assignment data. If a look-up of the particular sparse indicator is not successful or if a work flow calls for additional stages, the information associated with the sparse indicator and/or the result(s) from the look-up may be directed to data processor 840.

Look-up engine 830 may further allow for filtering of sparse indicators, such as to determine when a reviewer-assisted analysis of a particular sparse indicator is not needed or not to be performed. For example, some sparse indicators may be pre-assigned to particular data bucket(s) and look-up engine may identify these sparse indicators as such. In another example, some sparse indicators may not be suitable for an iterative analysis and/or may be predetermined such that no resources are to be used in analyzing the sparse indicator. For example, some sparse indicators are associated with a position in a full data set for which analysis is determined to be unnecessary. Optionally, some sparse indicators are associated with a position in a full data set and value for which analysis is determined to be unnecessary.

System 800 further includes a data processor 840, which may perform iterative performance of automated processing for each of the sparse indicators in data stream 820. It will be appreciated that more data processors 840 may be included in system 800, such as to allow parallel and/or sequential work flow performance. Data processor 840 may perform fully automated processing of stages of a work flow and forward stage result(s) to bucketor 855 for data bucket assignment.

In some embodiments of automated processing for one or more sparse indicators, data processor 840 may encounter one or more stages having a stage-progression condition that is not satisfied or may determine that a reviewer-engagement condition is satisfied (e.g., due to a failure to identify a bucket for a sparse indicator in a look-up data store or due to determining that a bucket assignment for a sparse indicator is associated with a confidence metric that is below a predefined quantitative or qualitative threshold). Optionally, data processor 840 may generate and transmit a query communication 845 that includes one or more of a position associated with a sparse indicator, one or more values associated with the sparse indicator, and a result(s) from a previous stage of the work flow. The query communication 845 may be transmitted, for example, from system 800 to an evaluation device 170 to facilitate review and/or input by evaluator 175. For example, evaluation device 170 may receive the query communication 845 and display the included information to allow the evaluator 175 to provide response data to satisfy the stage-progression condition. Evaluation device 170 may then generate a response communication 850 that includes response data. Data processor 840 may receive response communication 850 and use the included response data to complete or augment the automated processing to generate stage result(s). Once the stages are completed according to the work flow, stage result(s) may be forward to bucketor 855.

System 800 further includes bucketor 855, which may assign each sparse indicator to a bucket of a plurality of data buckets, such as by using stage result(s) from data processor 840 and/or look-up result(s) from look-up engine 830. Bucketor 855 may then assign a particular data bucket for the particular sparse indicator being analyzed. It will be appreciated that more bucketors 855 may be included in system 800. In system 800, five data buckets 860, 862, 864, 866, and 868 are depicted, though it will be appreciated that more or fewer data buckets may be utilized. Some or all of data buckets 860-868 may, for example, span a range along a spectrum of a degree of likeliness that a client will transition into or experience a particular state. Upon full or partial completion of the assignment of the sparse indicators in data stream 820 to data buckets, information may be passed to bucket assessor 870. It will be appreciated that counts assigned to a set of buckets may be determined with respect to each of multiple position ranges (or units) or combinations thereof. For example, for a given data set, a count may be generated for each of a set of buckets and for each of a set of units that reflects a number of sparse indicators detected for the unit that correspond to the bucket.

System 800 further includes bucket assessor 870. Although bucket assessor 870 is shown schematically as a separate component from bucketor 855, it will be appreciated that bucket assessor 870 and bucketor 855 may be combined in a single component or process. Bucket assessor 870 may identify a number of sparse indicators assigned to particular buckets 860-868 using one or more counters, for example. Bucket assessor 870 may optionally determine whether one or more buckets include counts above a predetermined threshold (e.g., whether a count exceeds zero). The predetermined threshold may be (for example) defined by a user, generated based on machine learning, generated based on a virtual structural representor, and/or generated based on a population analysis. For example, in one instance, it may be determined whether a count in a given bucket or a total count across a combination of buckets (e.g., a bucket corresponding to a highest predicted likelihood, amongst the buckets, of transitioning into or being in a particular state or two buckets corresponding to the two highest predicted likelihoods) exceeds zero. It will be appreciated that predetermined thresholds for each data bucket may be independent of other predetermined thresholds. Bucket assessor 870 may forward the counts corresponding to the buckets 860-868 to signal generator 875.

A signal generator 875 may use the counts and/or results of a threshold comparison, for example, to generate a communication 880 indicative of whether a number of sparse indicators assigned to particular data buckets exceed the predetermined threshold(s). In some embodiments, different templates for communication 880 may be used depending on which data bucket(s) exceed the predetermined threshold(s) and or by how much a threshold(s) is exceeded, for example. Communication 880 may identify, for example, whether one or more sparse indicators are assigned to a bucket representing a highest probability, amongst the buckets, of transitioning into or being at a particular state. Communication 880 may identify, for example, whether one or more sparse indicators are assigned to each of one or more other buckets.

Figure 9:
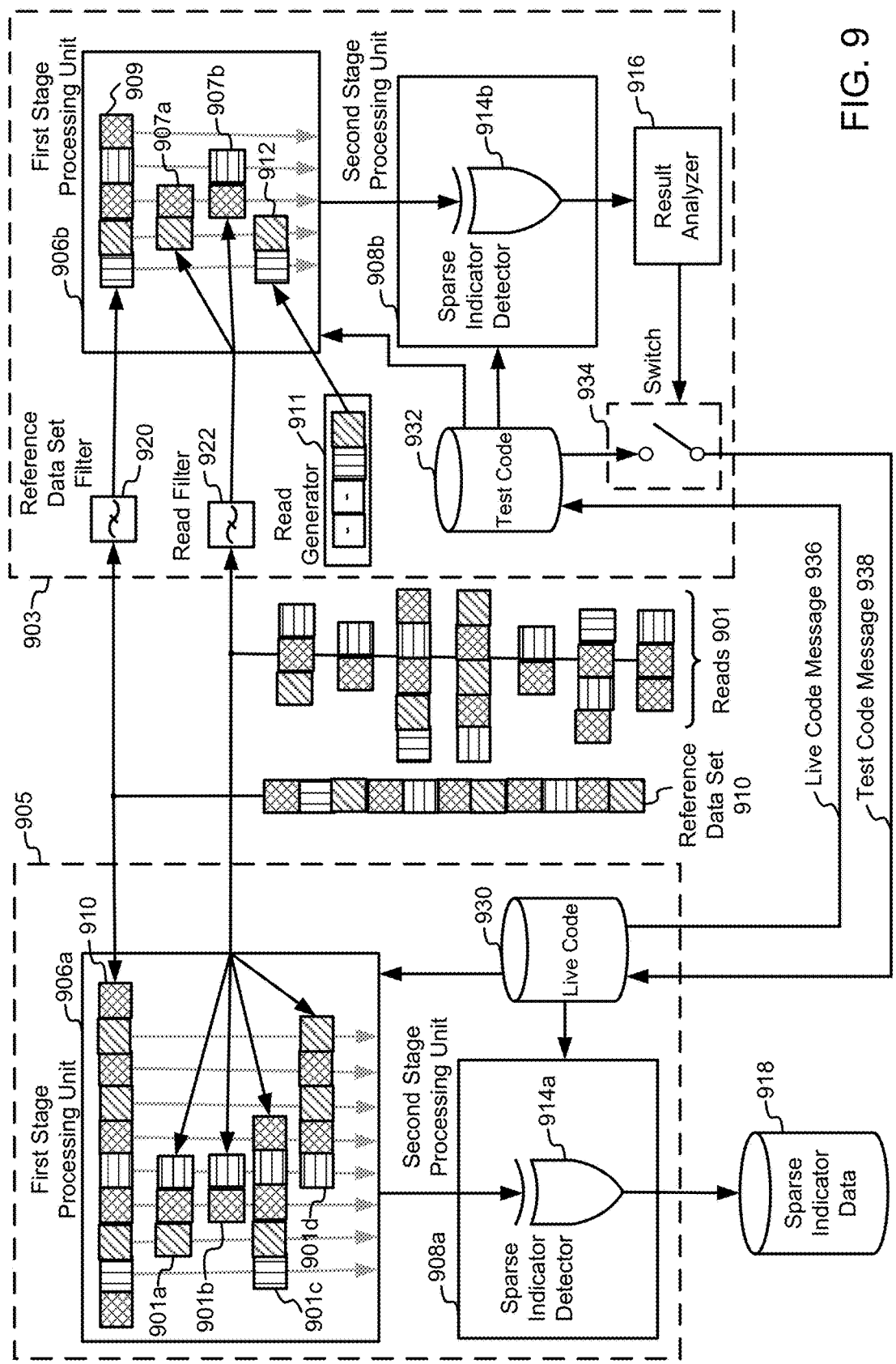
FIG. 9 shows a representation of an assessment system and a functional testing environment, in accordance with some embodiments.

Referring next to FIG. 9, a representation of an assessment system 905 and a functional testing environment 903 is shown, in accordance with some embodiments. Assessment system 905 may represent portions of assessment systems 105 and 305 and may, for example, include portions of data generators 140 and 340. Assessment system 905 may be in data communication with one or more other components of assessment network 100 or 300, such as client device 130 and data store 372, for example.

In some instances, a plurality of reads 901 are received at each of assessment system 905 and functional testing environment 903 from a data source such as data generator 140. Reads 901 may be transmitted to assessment system 905 and functional testing environment 903 in a batch-mode, in a streamlining mode, in real-time as each read is produced, and/or upon request. Reads 901 may also be stored at a data store local or remote to data generator 140. Reads 901 may correspond to one or more particular clients. In some instances, assessment system 905 and functional testing environment 903 may detect and/or extract each of reads 901 that correspond to a particular client. The detection may include detecting each of reads 901 and extracting an identifier associated with each of reads 901 (e.g., and comparing the identifier to one or more stored identifiers). It will be appreciated that, in one instance, assessment system 905 and functional testing environment 903 may include multiple client filters so as to detect data from each of multiple clients, or a single client filter may be configured to detect which of multiple clients a read corresponds.

Assessment system 905 and functional testing environment 903 may include one or more processing units, such as first stage processing units 906 for aligning reads to a corresponding portion of a reference data set 910, and second stage processing units 908 for collectively analyzing data corresponding to one or more aligned reads. One or more portions of first stage processing unit 906*a* may be identical to one or more portions of first stage processing unit 906*b*, and one or more portions of second stage processing unit 908*a* may be identical to one or more portions of second stage processing unit 908*b*.

First stage processing units 906 may align each of reads 901 to a portion of reference data set 910. In some instances, the reference data set 910 includes a set of identifiers associated with an order along a dimension (e.g., a vector of identifiers). The portion can correspond to a subset (e.g., of consecutive positions) of the set of identifiers. Thus, for example, the portion may be defined by a start position, end position, position range and/or length. In some instances, the portion can correspond to, for example, part or all of one or more units of reference data set 910 (e.g., each of which may be associated with part of the set of identifiers). It will be appreciated that, with respect to data for a particular client, reads 901 may be aligned to corresponding portions of reference data set 910 concurrently, in batch mode, as data is received and/or in response to detecting satisfaction of another condition.

A variety of alignment techniques may be used, including those discussed previously. In some instances, post-alignment processing (such as that performed by second stage processing units 908) commences upon generation of individual alignment results. In some instances, an alignment condition is to be satisfied to trigger such post-alignment processing. For example, an alignment condition may identify an absolute or functionally described quantity of reads that are to have been aligned (e.g., generally and/or at one or more specific parts of a reference data set) to satisfy the condition. More sophisticated conditions may identify, for example, a minimum, average or median quantity of reads to be aligned across one or more specific parts of a reference data set.

In some instances, first stage processing unit 906*a* receives reference data set 910 in its entirety and performs alignment without trimming or truncating. Similarly, first stage processing unit 906*a* receives reads 901 in their entirety and performs alignment without trimming, truncating, downsampling, or performing other pre-processing techniques on reads 901. For example, each of reads 901*a*, 901*b*, 901*c*, and 901*d* is identical to a read within reads 901 as shown in FIG. 9.

In contrast, first stage processing unit 906b receives a reduced reference data set 909 corresponding to one or more portions of reference data set 910. In general, reduced reference data set 909 is smaller in size (i.e., contains fewer identifiers) than reference data set 910. Reduced reference data set 909 is generated by reference data set 910 being filtered by a reference data set filter 920 included in functional testing environment 903. Reference data set filter 920 receives reference data set 910 and passes it through one or more subfilters that trim, crop, or truncate reference data set 910 to reduce its size. In some instances, the size of reduced reference data set 909 (e.g., number of identifiers) may be several orders of magnitude smaller than the size of reference data set 910. Reference data set filter 920 is described in further detail in reference to FIG. 10.

First stage processing unit 906b receives a set of reads 907 that may include fewer reads than reads 901 and/or shorter reads compared to reads 901. For example, read 907a may be a truncated version of read 901a, read 907b may be identical to read 901b, and reads 901c and 905d may by filtered out. Set of reads 907 are generated by reads 901 being filtered by a read filter 922 included in functional testing environment 903. Read filter 922 may perform one or more of downsampling reads 901 to reduce the number of reads, truncating reads 901 to decrease the size of the reads, and duplicate identifying to also reduce the number of reads. Read filter 922 is described in further detail in reference to FIG. 11.

Functional testing environment 903 may include a read generator 911 for generating reads for first stage processing unit 906b and/or second stage processing unit 908b. A generated read 912 may include one or more identifiers and may be generated such that it aligns with a corresponding portion of reduced reference data set 909 for which other reads within set of reads 907 are not aligned with. For example, in some instances it is advantageous for every portion of reduced reference data set 909 to have at least one read that is aligned with that portion. Because it may be computational intensive to process all of reads 901 to determine whether at least one read is aligned to all portions of reduced reference data set 909, read generator 911 may generate one or more generated reads 912 such that reduced reference data set 909 may be completely covered at shorter time scales. In some embodiments, read generator 911 is activated when a predetermined threshold amount of reads are received by first stage processing unit 906b. The predetermined threshold may correspond to a number of reads for which processing within first stage processing unit 906b and second stage processing unit 908b may begin to be slowed and/or burdened. In other embodiments, read generator 911 is activated simultaneous to first stage processing unit 906b receiving set of reads 907 such that reads that are aligned to reduced reference data set 909 include both set of reads 907 and generated reads 912.

Although not depicted in FIG. 9, in some embodiments, functional testing environment 903 includes a reference data set generator for generating a generated reference data set for use in first stage processing unit 906b and/or second stage processing unit 908b. The generated reference data set may correspond to various portions of reference data set 910 and may include portions that correspond to one or more sparse indicators. For example, the generated reference data set may include a particular portion of reference data set 910 that corresponds to a known sparse indicator and may also include some number of identifiers (e.g., 100) on each side of the particular portion such that reads may be aligned to the generated reference data set.

One or both of first stage processing units 906 and second stage processing units 908 may include a client data set generator for generating and/or updating a client data set. For example, the client data set may be generated and/or updated in response to alignment of each read, in response to alignment of at least a threshold number of reads, in response to alignment of all reads, at defined time intervals, etc. The client data set may be generated and/or updated prior to receiving and/or aligning all reads from a given processing associated with a client and/or in real-time as reads for a client are aligned. In some instances, updating of the client data set is conditioned. For example, the updating may only be performed if a read overlaps with a position (or set of positions) for which a previous coverage vector, identifier consistency, identifier reliability and/or confidence is below a predefined threshold.

Second stage processing units 908 may include various processing systems, including sparse indicator detectors 914. Sparse indicator detectors 914 may be similar or identical to system 800. Second stage processing units 908 may produce one or more results, which may be sent to a sparse indicator data store 918 or a result analyzer 916. The results may include any of the following: a list of detected sparse indicators, a number of sparse indicators assigned to different buckets, an indication of whether a number of sparse indicators assigned to particular data buckets exceed a predetermined threshold or by how much the predetermined threshold is exceeded, a resource usage corresponding to an amount of processing performed or an amount of memory used, an amount of time for processing reads using first stage processing units 906 and/or second stage processing units 908, a similarly score corresponding to the similarity between a result produced by second stage processing unit 908a and the same result produced by second stage processing unit 908b.

One or more stages of assessment system 905 and functional testing environment 903 may be performed via execution of code, such as live code 930 for first stage processing unit 906a and second stage processing unit 908a, and test code 932 for first stage processing unit 906b and second stage processing unit 906b. For example, live code 930 and test code 932 may be linked to the various hardware components performing alignment, client data set generation, sparse indicator detection, etc. Different portions of live code 930 may correspond to different portions of assessment system 905, e.g., a first portion of live code 930 may correspond to performance of first stage processing unit 906a and a second portion of live code 930 may correspond to performance of second stage processing unit 908a.

In some instances, one or more modifications (or proposed modifications) to live code 930 may cause a live code message 936 to be sent to test code 932. Live code message 936 may include all or part of the one or more modifications to live code 930, and may include all or part of live code 930. Live code message 936 may be sent automatically upon detection of a modification to live code 930, upon request, upon a determination that the modification has been flagged for being non-trivial, upon a determination that the modification corresponds to a stage within assessment system 905 that is particularly computationally intensive, or at defined intervals. Live code message 936 may cause part or all of test code 932 to be replaced with the contents of live code message 936. For example, live code message 936 may contain a copy of live code 930 in its entirety and cause test code 932 to be replaced in its entirety by the copy. As another example, live code message 936 may contain code corresponding to first stage processing unit 906a and may cause only the portion of test code 932 corresponding to first stage processing unit 906b to be replaced.

In some embodiments, upon receipt of live code message 936, test code 932 may edit portions of the received code to accommodate the difference in hardware between assessment system 905 and functional testing environment 903 (e.g., to accommodate reference data set filter 920, read filter 922, read generator 911, etc.). In other embodiments, assessment system 905 may edit live code message 936 prior to transmission to functional testing environment 903 to accommodate the difference in hardware. In some instances, live code message 936 does not contain code but rather includes instructions to perform a functional testing using test code 932 having code that was previously executed. Optionally, live code message 936 may include functional testing specifications for performing a functional testing. For example, the functional testing specifications may include which stages are to be tested, instructions for generating reduced reference data set 909 (e.g., instructions for reference data set filter 920), instructions for generating set of reads 907 (e.g., instructions for read filter 922), instructions for determining whether or not a functional testing is successful (e.g., maximum run time, maximum resource usage, targets, etc.).

Functional testing environment 903 may perform a functional testing corresponding to at least part of a workflow of assessment system 905 by executing test code 932. Execution of test code 932 may cause performance of one or both of first stage processing unit 906b and second stage processing unit 908b, which may generate one or more results which are received and analyzed by result analyzer 916. In some instances, result analyzer 916 controls a switch 934 which allows a test code message 938 to be sent to live code 930. Test code message 938 may include a copy of all or part of test code 932, a success message corresponding to result analyzer 916 determining that the functional testing was successful, a failure message corresponding to result analyzer 916 determining that the functional testing was not successful, or one or more results received by result analyzer 916 (e.g., detected sparse indicators). Switch 934 may by default be set to an open position, and may be caused by result analyzer 916 to be set to a closed position when the one or results are received by result analyzer 916 or when some criteria based on the one or more results is satisfied. In some instances, switch 934 is located within assessment system 905.

Figure 10:
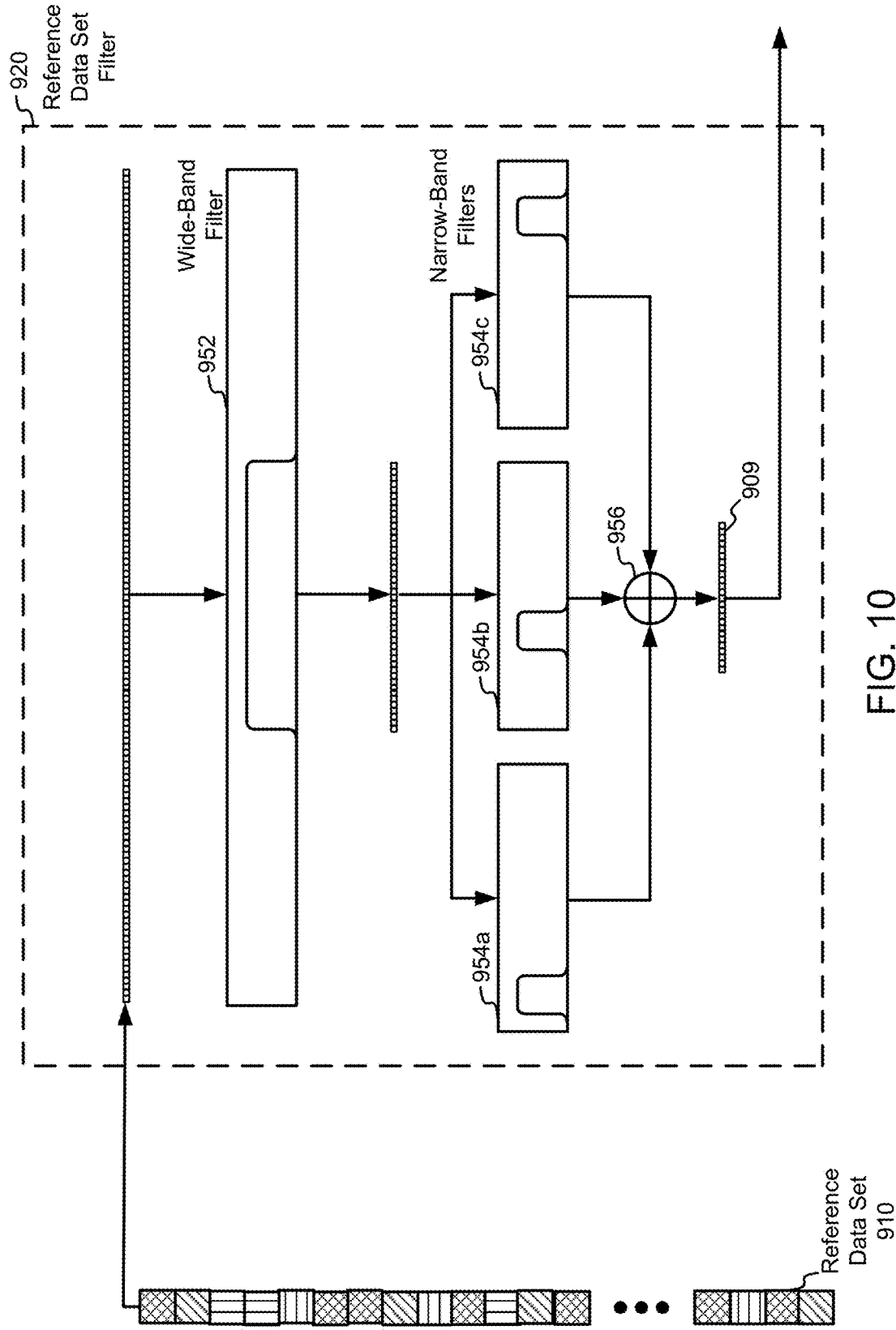
FIG. 10 shows a representation of a reference data set filter, in accordance with some embodiments.

Referring next to FIG. 10, a representation of reference data set filter 920 is shown. In some instances, reference data set filter 920 receives reference data set 910 and passes it through one or more subfilters that trim, crop, or truncate reference data set 910 to generate reduced reference data set 909. Reference data set filter 920 includes a wide-band filter 952 for filtering out a large portion of the identifiers within reference data set 910 (e.g., 90%, 95%, 99%, 99.9999%). The size of the passband of wide-band filter 952 may be sufficiently narrow such that functional testing run times are reasonably short and may also be sufficiently wide such that enough reads can be aligned and/or enough read processing can be performed.

Reference data set filter 920 may also include one or more narrow-band filters 954 that have higher precision cutoff points than wide-band filter 952. For example, while wide-band filter 952 may have a cutoff point precision of plus or minus 100 identifiers, narrow-band filters 954 may have cutoff point precisions of plus or minus 2 identifiers. Narrow-band filters 954 may retain important sections of reference data set 910 that correspond to sparse indicators. For example, narrow-band filters 954a, 954b, and 954c may retain sections of reference data set 910 that correspond to three different sparse indicators. In this manner, the functional testing may be performed on small sections of reference data set 910 and still generate results that may be similar to those achieved by assessment system 905. The outputs of narrow-band filters 954 are combined using a combiner 956 (e.g., by connecting outputs in a side-by-side configuration).

Figure 11:
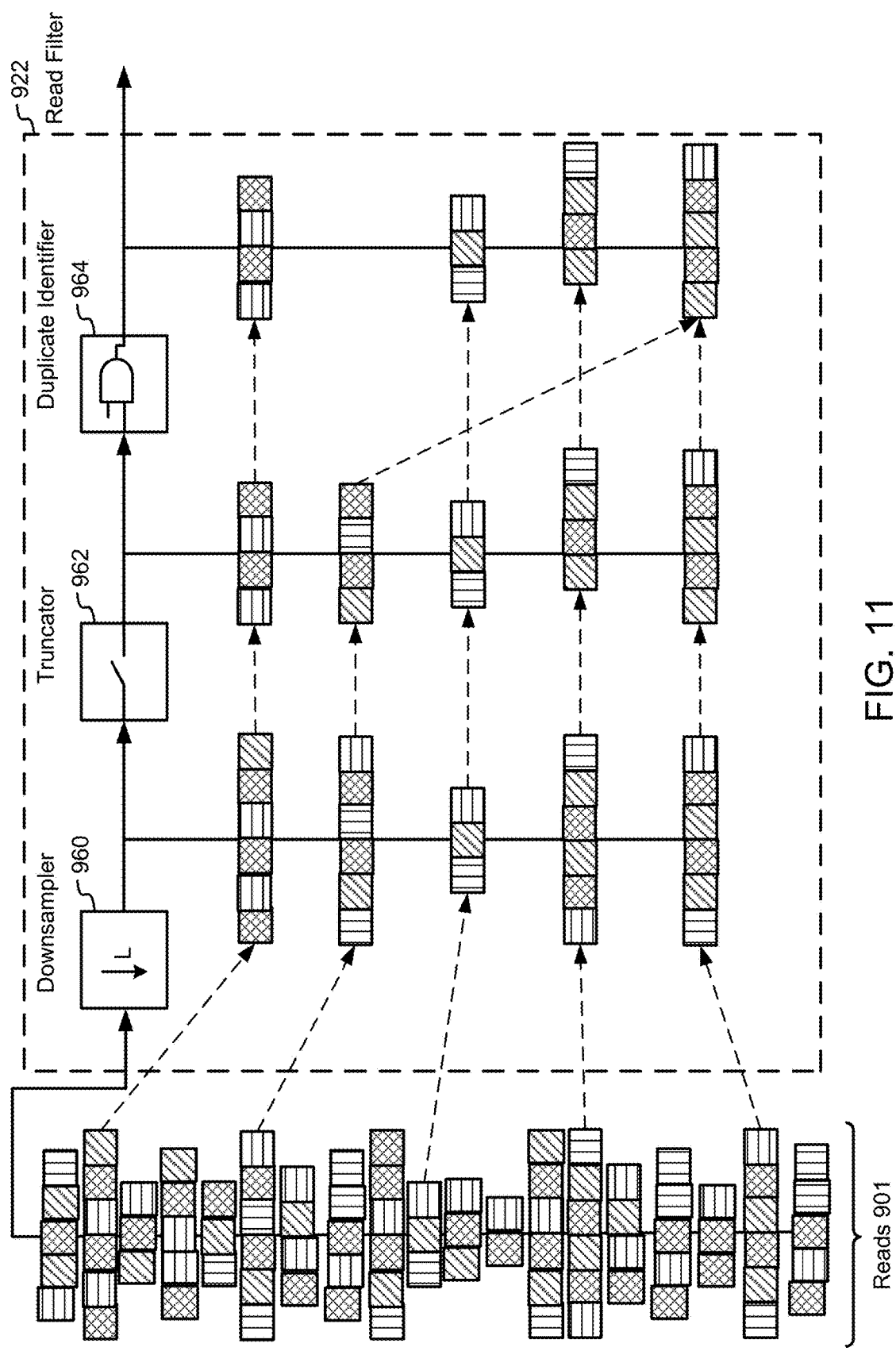
FIG. 11 shows a representation of a read filter, in accordance with some embodiments.

Referring next to FIG. 11, a representation of read filter 922 is shown. Read filter 922 includes a downsampler 960 for reducing the number of reads, a truncator 962 for decreasing the size of the reads, and a duplicate identifier 964 for reducing the number of reads that are redundant. Downsampler 960, truncator 962, and duplicate identifier 964 may be in any order, however downsampling first may greatly reduce the computational burden within functional testing environment 903. Downsampler 960 may be configured to delete a percentage or ratio of reads 901. For example, downsampler 960 may be configured to delete every other read, every $3^{rd}$ read, every $4^{th}$ read, or may be configured to delete 2 out of 3 reads, 3 out of 4 reads, 99,999 out of 100,000 reads, and the like. In the specific embodiment shown in FIG. 11, downsampler 960 is configured to delete 3 out of 4 reads (i.e., downsample by 4).

Truncator 962 may be configured to truncate each of reads 901 (i.e., those remaining after downsampling) by some amount. Reads 901 may be truncated by a set percentage (e.g., 50%) or by a set amount (e.g., 100 identifiers). Reads 901 may be truncated on both ends, on a single end, or may pass through truncator 962 without being truncated. Duplicate identifier 964 may be configured to identify reads 901 (i.e., those remaining after downsampling and truncating) that are duplicates of each other or near duplicates of each other. Redundant reads may be deleted based on the number of duplicates that already exist. For example, in some embodiments, every duplicate read or near duplicate read (reads having >50% of their identifiers in common) may be deleted. In other embodiments, duplicate reads are only deleted if there are already some threshold number of duplicates. For example, it may be advantageous to have a few duplicates of reads such that coverage vectors may be calculated during functional testing that are representative of coverage vectors calculated using assessment system 905.

Figure 12:
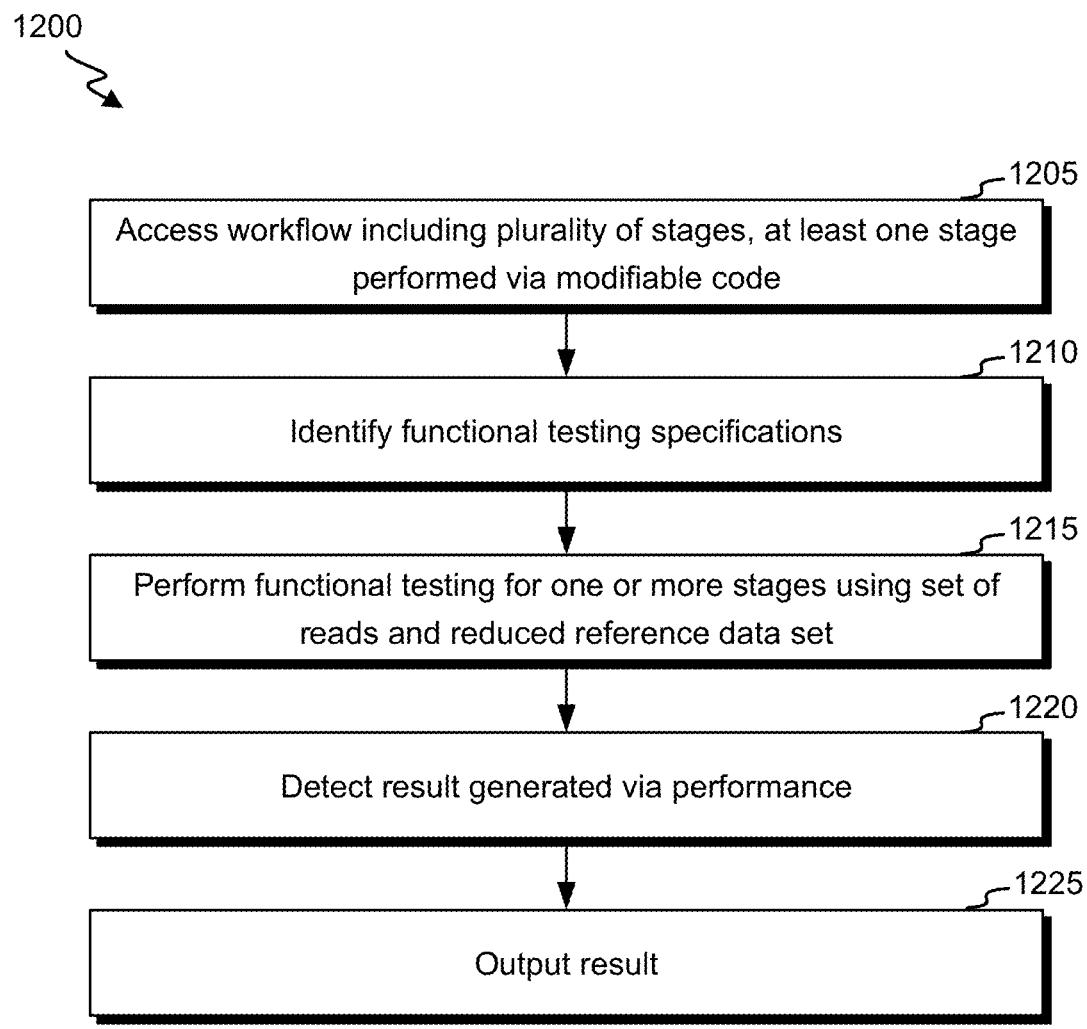
FIG. 12 illustrates a process for using functional testing to detect run-time impacts of code modifications, in accordance with some embodiments.

Referring next to FIG. 12, a process 1200 for using functional testing to detect run-time impacts of code modifications is shown. Process 1200 may be performed, for example, in part or in its entirety by an assessment system, such as assessment system 105, or by multiple systems, such as assessment system 905 and functional testing environment 903. Process 1200 begins at block 1205 where a workflow is accessed. The workflow may include various stages, including a first stage for aligning each of a plurality of reads with a corresponding portion of a reference data set, and a second stage for collectively analyzing data corresponding to the aligned reads. The first stage may be defined based on a first modifiable code and the second stage may be defined based on a second modifiable code. In some instances, the first modifiable code may include portions of code in common with the second modifiable code, such as subroutines or variables that are utilized in both stages. Furthermore, not all portions of the modifiable codes need be modifiable, such as certain programming language initialization routines that are executed prior to execution of the remaining code. Accessing the workflow may include initializing the workflow, sending or receiving data to one or more of the first stage processing unit and second stage processing unit, accessing any portion of code corresponding to the workflow, receiving inputs corresponding to the workflow, and the like.

At block 1210, functional testing specifications that correspond to the workflow are identified. Identifying the functional testing specifications may include receiving, sending, generating, and/or retrieving the functional testing specifications. For example, the functional testing specifications may be input by a user, may be automatically generated based on previously specified or default functional testing specifications, may be determined based on specified maximum run times or resource usages, and the like. The functional testing specifications may include a definition of at least part of the workflow to be conducted during functional testing. For example, the definition may indicate that a functional testing of all or part of the first stage is to be performed, all or part of the second stage is to be performed, and/or all or part of any other stages. For example, the definition may indicate that only the portion of the workflow corresponding to alignment of reads is to be performed.

The functional testing specifications may also include a reduced reference data set to be used in place of the reference data set in the functional testing. For example, the functional testing specifications may include details regarding a maximum size of the reduced reference data set, a filter setting for the reference data set filter (e.g., truncate by 99%), a set of identifiers comprising the reduced reference data set, and the like. In some embodiments, the size of the reduced reference data set is smaller than the size of the reference data set. The functional testing specifications may also include read data that includes a set of reads to be used as input for the functional testing. For example, the functional testing specifications may include details regarding a maximum number of the set of reads, a filter setting for the read filter (e.g., downsample by four, truncate by 50%, etc.), a number of generated reads to be generated by the read generator, a percentage of the read data that include generated reads versus the set of reads, a specified coverage vector to be satisfied, and the like.

At block 1215, the functional testing for at least part of the workflow is performed. Performing the functional testing may include performing one or more stages of the workflow using the read data and the reduced reference data set. Furthermore, performing the functional testing may include performing one or more stages of the workflow using different hardware components than is used when performing the workflow during normal operation of the assessment system. In some embodiments, the functional testing is performed using the same hardware components as is used when performing the workflow during normal operation but with modified inputs such as the read data (e.g., set of reads) and the reduced reference data set.

In some embodiments, performing the functional testing includes performing/executing different versions of modifiable code for different stages and causing the best performing version to be uploaded to the live code. For example, in some instances, ten or more versions of modifiable code corresponding to the first stage and/or the second stage may be used as test code in various iterations of functional testing. Results from the ten or more iterations (performances) may be compared and the best performing version (e.g., shortest run time, smallest resource usage) may be uploaded or sent to the live code.

In some instances, performing the functional testing causes one or more results to be generated. The results may include a list of detected sparse indicators, a number of sparse indicators assigned to different buckets, an indication of whether a number of sparse indicators assigned to a particular data bucket exceeds a predetermined threshold or by how much the predetermined threshold is exceeded, a resource usage corresponding to an amount of processing performed or an amount of memory used, an amount of time to perform the functional testing, and the like.

In some embodiments, the result is a time duration for performing a single stage, such as the first stage and the second stage. In some embodiments, the result is a time duration for performing multiple stages (e.g., the first and second stages) or performing the functional testing in its entirety. In some embodiments, the result is a resource usage (e.g., memory usage or processor usage) for performing a single stage, multiple stages (e.g., the first and second stages), or for performing the functional testing in its entirety. Optionally, a target may be identified related to an expectation or a desired constraint for the results. For example, a target may include a previous run time or a previous resource usage. In some instances, the result may be related to whether a target was met or exceeded. For example, a target may include a run time of 30 seconds, and a result may be that the target was met (e.g., run time of 29 seconds) or that the target was not met (e.g., run time of 31 seconds).

At block 1220, one or more of the results generated via the performance of the functional testing are detected. Detecting the results may include receiving or retrieving the results, reading the results, causing the results to be generated, executing a subroutine that inquires a current or previous system clock, a current or previous memory usage, or a current or previous processor usage and calculating the results based on the executed subroutine, and the like. In some embodiments, the results include a technical result indicating whether an error was detected or whether a warning was detected. In some embodiments, the result comprises detected alignment data indicating, for each read in the set of reads, a portion of the reduced reference data set to which the read was aligned. In some embodiments, the result comprises detected variant-detection data identifying, for each read in one or more of the set of reads, any variant detected to be in the read.

At block 1225, one or more of the results are outputted. Outputting the results may include outputting the results to a digital display, outputting the results to an external system, sending the results to the result analyzer for determining whether the functional testing was successful or unsuccessful, performing further processing based on the results, approving the results for storage, sending the results to storage, and the like. In some embodiments, the results include the test code, and outputting the results may include transmitting the test code to a remote server or a remote data store that are used to perform the live version of the workflow on client reads. Outputting the results may also include notifying the assessment system that the functional testing using the test code was successful. This may cause the assessment system to either keep the live code in its current state (in situations where the live code and test code are identical prior to performing the functional testing) or to upload the test code to cause the live code to reflect any code modifications (in situations where the live code is only updated after successful functional testing of the test code).

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for using functional testing to detect run-time impacts of code modifications, the method comprising:
    accessing a workflow for processing reads, the workflow including a plurality of stages, at least one stage of the plurality of stages being performed via execution of a modifiable code, the plurality of stages including:
        a first stage for aligning each of a plurality of reads with a corresponding portion of a reference data set, the first stage being defined based on first modifiable code, the reference data set including a reference sequence; and
        a second stage for collectively analyzing data corresponding to the aligned reads, the second stage being defined based on second modifiable code;
    identifying functional testing specifications to correspond with the workflow, wherein the functional testing specifications include:
        a definition of at least part of the workflow to be conducted during functional testing, the at least part of the workflow including one or more stages of the plurality of stages;
        a reduced reference data set to be used in place of the reference data set in the functional testing, a size of the reduced reference data set being smaller than a size of the reference data set; and
        read data that includes a set of reads to be used as input for the functional testing, each read of the set of reads including a sequence that identifies set of bases, the set of bases being arranged in a particular order in the read;
    performing the functional testing for the at least part of the workflow, the functional testing including performing the one or more stages of the workflow using the read data and the reduced reference data set, wherein performing the one or more stages of the workflow includes performing a modified version of at least one modifiable code of a plurality of modifiable codes, the plurality of modifiable codes including the first modifiable code and the second modifiable code, and each of the plurality of modifiable codes corresponding to a stage of the plurality of stages of the workflow;
    detecting a result generated via the performance of the functional testing for the at least part of the workflow;
    outputting the result;
    determining that the workflow is to be updated; and
    in response to determining that the workflow is to be updated, updating a version of the workflow to include the modified version of the at least one modifiable code.

2. The method of claim 1, wherein the one or more stages of the at least part of the workflow includes the second stage but not the first stage, and wherein the read data includes an aligned set of reads.

3. The method of claim 1, wherein the result includes a technical result indicating one or more of:
    whether an error was detected;
    whether a warning was detected;

a time duration of performing the one or more stages; and
a characterization of a resource usage while performing the one or more stages.

4. The method of claim 1, wherein the result is one or more of:
alignment data indicating, for each read in the set of reads, a portion of the reduced reference data set to which the read was aligned; and
variant-detection data identifying, for each read in one or more of the set of reads, any variant detected to be in the read.

5. The method of claim 1, wherein the version of the workflow includes a live version of the workflow and wherein the method further comprises:
detecting an input corresponding to an indication that the modified version of the at least one modifiable code is approved for storage, wherein the determining that the workflow is to be updated is based on the input.

6. The method of claim 1, wherein updating the version includes transmitting the modified version of the at least one modifiable code to a remote server or remote data store, the remote server or remote data store being used to perform the version of the workflow on client reads.

7. The method of claim 1, further comprising:
accessing a second set of reads, each read in the second set of reads corresponding to a particular client; and
performing the workflow using the second set of reads, the workflow being performed using the modified version of the at least one modifiable code.

8. A system, comprising:
one or more data processors; and
a non-transitory computer readable storage medium containing instructions which when executed on the one or more data processors, cause the one or more data processors to perform actions including:
 accessing a workflow for processing reads, the workflow including a plurality of stages, at least one stage of the plurality of stages being performed via execution of a modifiable code, the plurality of stages including:
  a first stage for aligning each of a plurality of reads with a corresponding portion of a reference data set, the first stage being defined based on first modifiable code, the reference data set including a reference sequence; and
  a second stage for collectively analyzing data corresponding to the aligned reads, the second stage being defined based on second modifiable code;
 identifying functional testing specifications to correspond with the workflow, wherein the functional testing specifications include:
  a definition of at least part of the workflow to be conducted during functional testing, the at least part of the workflow including one or more stages of the plurality of stages;
  a reduced reference data set to be used in place of the reference data set in the functional testing, a size of the reduced reference data set being smaller than a size of the reference data set; and
  read data that includes a set of reads to be used as input for the functional testing, each read of the set of reads including a sequence that identifies set of bases, the set of bases being arranged in a particular order in the read;
 performing the functional testing for the at least part of the workflow, the functional testing including performing the one or more stages of the workflow using the read data and the reduced reference data set, wherein performing the one or more stages of the workflow includes performing a modified version of at least one modifiable code of a plurality of modifiable codes, the plurality of modifiable codes including the first modifiable code and the second modifiable code, and each of the plurality of modifiable codes corresponding to a stage of the plurality of stages of the workflow;
 detecting a result generated via the performance of the functional testing for the at least part of the workflow;
 outputting the result;
 determining that the workflow is to be updated; and
 in response to determining that the workflow is to be updated,
 updating a version of the workflow to include the modified version of the at least one modifiable code.

9. The system of claim 8, wherein the one or more stages of the at least part of the workflow includes the second stage but not the first stage, and wherein the read data includes an aligned set of reads.

10. The system of claim 8, wherein the result includes a technical result indicating one or more of:
whether an error was detected;
whether a warning was detected;
a time duration of performing the one or more stages; and
a characterization of a resource usage while performing the one or more stages.

11. The system of claim 8, wherein the result is one or more of:
alignment data indicating, for each read in the set of reads, a portion of the reduced reference data set to which the read was aligned; and
variant-detection data identifying, for each read in one or more of the set of reads, any variant detected to be in the read.

12. The system of claim 8, wherein the version of the workflow includes a live version of the workflow
detecting an input corresponding to an indication that the modified version of the at least one modifiable code is approved for storage, wherein the determining that the workflow is to be updated is based on the input.

13. The system of claim 8, wherein
updating the version includes transmitting the modified version of the at least one modifiable code to a remote server or remote data store, the remote server or remote data store being used to perform the version of the workflow on client reads.

14. The system of claim 8, wherein the actions further comprise:
accessing a second set of reads, each read in the second set of reads corresponding to a particular client; and
performing the workflow using the second set of reads, the workflow being performed using the modified version of the at least one modifiable code.

15. A computer-program product tangibly embodied in a non-transitory machine-readable storage medium, including instructions configured to cause one or more data processors to perform actions including:
accessing a workflow for processing reads, the workflow including a plurality of stages, at least one stage of the plurality of stages being performed via execution of a modifiable code, the plurality of stages including:
 a first stage for aligning each of a plurality of reads with a corresponding portion of a reference data set, the first stage being defined based on first modifiable code, the reference data set including a reference sequence; and a second stage for collectively analyzing data corresponding to the aligned reads, the second stage being defined based on second modifiable code;

identifying functional testing specifications to correspond with the workflow, wherein the functional testing specifications include:

a definition of at least part of the workflow to be conducted during functional testing, the at least part of the workflow including one or more stages of the plurality of stages;

a reduced reference data set to be used in place of the reference data set in the functional testing, a size of the reduced reference data set being smaller than a size of the reference data set; and read data that includes a set of reads to be used as input for the functional testing, each read of the set of reads including a sequence that identifies set of bases, the set of bases being arranged in a particular order in the read;

performing the functional testing for the at least part of the workflow, the functional testing including performing the one or more stages of the workflow using the read data and the reduced reference data set, wherein performing the one or more stages of the workflow includes performing a modified version of at least one modifiable code of a plurality of modifiable codes, the plurality of modifiable codes including the first modifiable code and the second modifiable code, and each of the plurality of modifiable codes corresponding to a stage of the plurality of stages of the workflow;

detecting a result generated via the performance of the functional testing for the at least part of the workflow;

outputting the result;

determining that the workflow is to be updated; and in response to determining that the workflow is to be updated, updating a version of the workflow to include the modified version of the at least one modifiable code.

16. The computer-program product of claim 15, wherein the one or more stages of the at least part of the workflow includes the second stage but not the first stage, and wherein the read data includes an aligned set of reads.

17. The computer-program product of claim 15, wherein the result includes a technical result indicating one or more of:

whether an error was detected;

whether a warning was detected;

a time duration of performing the one or more stages; and a characterization of a resource usage while performing the one or more stages.

18. The computer-program product of claim 15, wherein the result is one or more of:

alignment data indicating, for each read in the set of reads, a portion of the reduced reference data set to which the read was aligned; and variant-detection data identifying, for each read in one or more of the set of reads, any variant detected to be in the read.

19. The computer-program product of claim 15, wherein the version of the workflow includes a live version of the workflow detecting an input corresponding to an indication that the modified version of the at least one modifiable code approved for storage, wherein the determining that the workflow is to be updated is based on the input.

20. The computer-program product of claim 15, wherein the actions further comprise:

accessing a second set of reads, each read in the second set of reads corresponding to a particular client; and performing the workflow using the second set of reads, the workflow being performed using the modified version of the at least one modifiable code.

* * * * *